US012417673B2

(12) United States Patent
McIntosh et al.

(10) Patent No.: US 12,417,673 B2
(45) Date of Patent: Sep. 16, 2025

(54) TEMPORARILY ASSOCIATING AN AWARD WITH A SPECIFIC USER

(71) Applicant: IGT, Las Vegas, NV (US)

(72) Inventors: Jeffery McIntosh, Dieppe (CA); Dwayne Nelson, Las Vegas, NV (US)

(73) Assignee: IGT, Las Vegas, NV (US)

(*) Notice: Subject to any disclaimer, the term of this patent is extended or adjusted under 35 U.S.C. 154(b) by 274 days.

(21) Appl. No.: 18/214,879

(22) Filed: Jun. 27, 2023

(65) Prior Publication Data

US 2025/0006002 A1 Jan. 2, 2025

(51) Int. Cl.
*G07F 17/32* (2006.01)

(52) U.S. Cl.
CPC ...... *G07F 17/3258* (2013.01); *G07F 17/3239* (2013.01); *G07F 17/3267* (2013.01); *G07F 17/3276* (2013.01)

(58) Field of Classification Search
None
See application file for complete search history.

(56) References Cited

U.S. PATENT DOCUMENTS

| | | | |
|---|---|---|---|
| 8,147,319 B2 | 4/2012 | Hornik et al. | |
| 8,506,392 B2 | 8/2013 | Jaffe | |
| 8,628,410 B2 | 1/2014 | Jaffe et al. | |
| 8,641,499 B2 | 2/2014 | Gomez | |
| 9,704,352 B2 | 7/2017 | Robbins et al. | |
| 10,332,336 B1 | 6/2019 | Halvorson | |
| 11,011,024 B2 | 5/2021 | Hallerbach et al. | |
| 11,373,481 B1 | 6/2022 | Weyant | |
| 11,380,164 B2 | 7/2022 | Hughes et al. | |
| 11,568,704 B2 | 1/2023 | Harris | |
| 2005/0159207 A1* | 7/2005 | Thomas | G07F 17/32 463/20 |
| 2006/0240889 A1* | 10/2006 | Walker | G07F 17/3276 463/20 |
| 2010/0004048 A1 | 1/2010 | Brito | |
| 2011/0201403 A1 | 8/2011 | Jaffe et al. | |
| 2014/0274343 A1* | 9/2014 | Herbert | G07F 17/3244 463/25 |
| 2016/0005271 A1 | 1/2016 | Vasquez et al. | |

* cited by examiner

*Primary Examiner* — Jason T Yen
(74) *Attorney, Agent, or Firm* — Neal, Gerber & Eisenberg LLP

(57) ABSTRACT

Systems and methods that temporarily associate an award with a specific user such that during the temporary association, the award is only available to be won by that specific user.

20 Claims, 8 Drawing Sheets

1000

TEMPORARILY ASSOCIATING AN AWARD WITH A SPECIFIC USER

CROSS-REFERENCE TO RELATED APPLICATION

This application is related to the following commonly owned patent application: U.S. application Ser. No. 18/214,912, entitled "TEMPORARILY CAUSING AN UNAVAILABLE AWARD TO BE AVAILABLE TO A SPECIFIC USER,".

BACKGROUND

In various embodiments, the gaming systems and methods of the present disclosure temporarily associate an award, such as a progressive award, with a specific player such that during the temporary association, the award is only available to be won by that specific player.

Gaming machines may provide players awards in primary games. Gaming machines generally require the player to place or make a wager to activate the primary or base game. The award may be based on the player obtaining a winning symbol or symbol combination and on the amount of the wager.

BRIEF SUMMARY

In certain embodiments, the present disclosure relates to a gaming system including a processor, and a memory device that stores a plurality of instructions. When executed by the processor, the instructions cause the processor to maintain a progressive award. When executed by the processor responsive to an occurrence of a progressive award exclusivity event associated with a first player and a period of exclusivity, the instructions cause the processor to exclusively associate the progressive award with the first player. When executed by the processor responsive to an occurrence of a progressive award triggering event in association with the first player during the period of exclusivity, the instructions cause the processor to cause the progressive award to be provided to the first player. When executed by the processor responsive to an occurrence of the progressive award triggering event in association with a second, different player during the period of exclusivity, the instructions cause the processor to continue to maintain the progressive award without causing the progressive award to be provided to the second, different player.

In certain embodiments, the present disclosure relates to a gaming system including a processor, and a memory device that stores a plurality of instructions. When executed by the processor, the instructions cause the processor to maintain a progressive award. When executed by the processor responsive to an occurrence of a progressive award increment event, the instructions cause the processor to increment a value of the progressive award. When executed by the processor responsive to an occurrence of a progressive award exclusivity event associated with a first player and a period of exclusivity, the instructions cause the processor to exclusively associate the incremented value of the progressive award with the first player. When executed by the processor responsive to an occurrence of a progressive award triggering event in association with the first player during the period of exclusivity, the instructions cause the processor to cause the incremented value of the progressive award to be provided to the first player. When executed by the processor responsive to an occurrence of the progressive award triggering event in association with a second, different player during the period of exclusivity, the instructions cause the processor to cause a non-incremented value of the progressive award to be provided to the second, different player.

In certain embodiments, the present disclosure relates to a gaming system including a processor, and a memory device that stores a plurality of instructions. When executed by the processor, the instructions cause the processor to maintain a progressive award. When executed by the processor responsive to an occurrence of a progressive award exclusivity event associated with a first player of a first player tracking status, the instructions cause the processor to exclusively associate the progressive award with the first player for a first period of exclusivity. During the first period of exclusivity, the progressive award is locked against being provided to any player except the first player. When executed by the processor responsive to an occurrence of the progressive award exclusivity event associated with a second, different player of a second, different player tracking status, the instructions cause the processor to exclusively associate the progressive award with the second, different player for a second, different period of exclusivity. During the second, different period of exclusivity, the progressive award is locked against being provided to any player except the second, different player.

Additional features are described herein, and will be apparent from the following Detailed Description and the figures.

DETAILED DESCRIPTION

Figure 1:
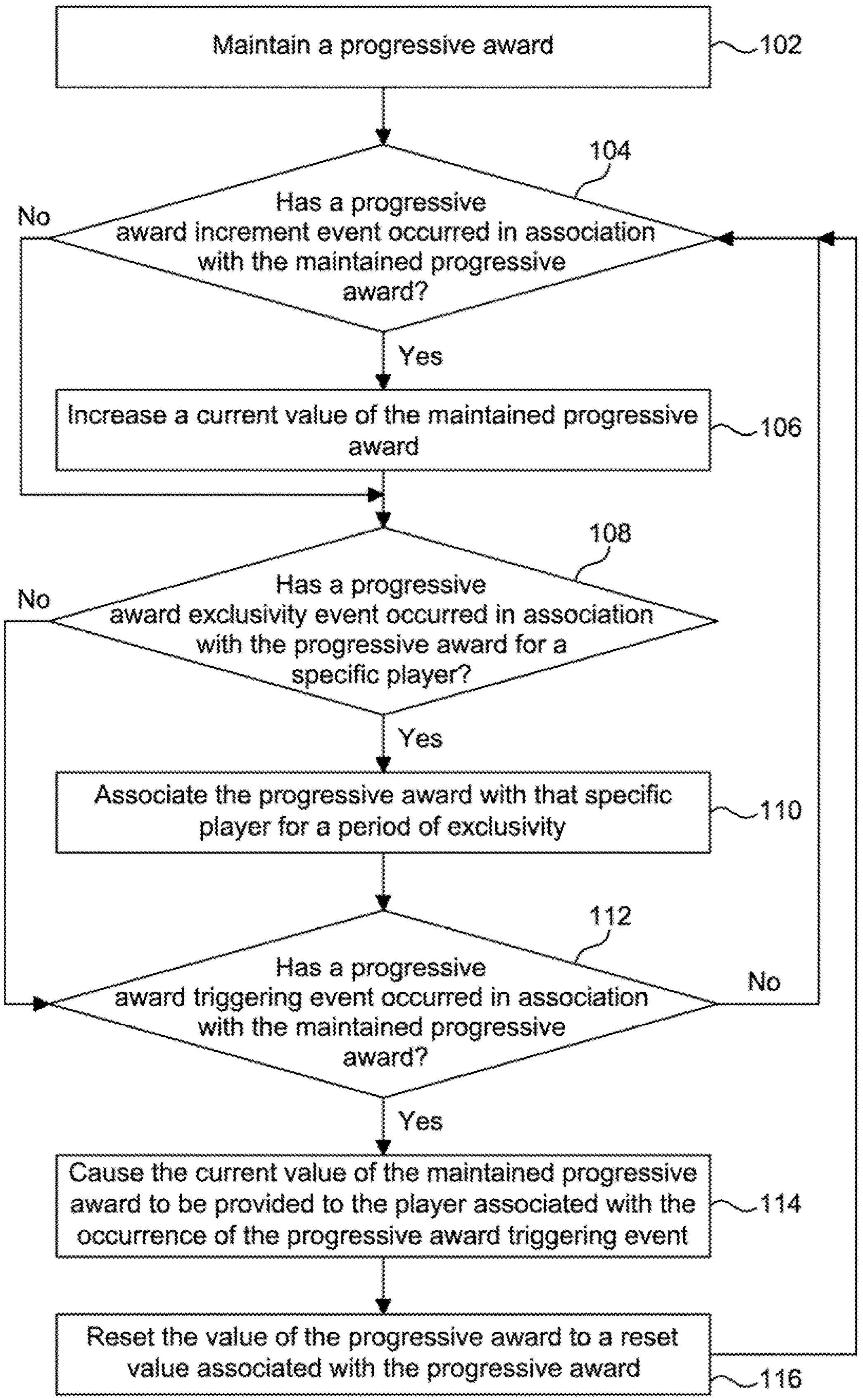
FIG. 1 is a flow chart an example process for operating a gaming system that may exclusively associate a progressive award with a specific player for a period of exclusivity.

In various embodiments, the systems and methods of the present disclosure temporarily associate an award, such as a progressive award, with a specific player such that during the temporary association, the award is only available to be won by that specific player.

In certain embodiments, the gaming system maintains one or more awards. In these embodiments, upon an award increment event associated with a maintained award, the gaming system increases the value of that award. For example, the gaming system maintains one or more progressive awards and upon a progressive award increment event associated with one of the progressive awards, the gaming system increases the value of that progressive award.

In addition to periodically increasing the value of zero, one or more maintained awards, upon an occurrence of an award exclusivity event associated with the maintained award, the gaming system causes that maintained award to be associated with an individual player for a temporary duration. Such an exclusive association between an individual player and a maintained award provides that the individual player and only the individual player is eligible to potentially win the maintained award for the temporary duration. Put differently, responsive to an award exclusivity event occurring for a particular player, the gaming system isolates that particular award for that particular player and prevents or otherwise locks other players from being eligible to win that specific instance of that award. For example, upon a progressive award exclusivity event occurring in association with a maintained progressive award for a first player, the gaming system modifies, for a limited period of time, how it operates such that the maintained progressive award may be won only by that first player (and the progressive award may not be won by any other players during the limited period of time).

In certain embodiments, for a limited duration during which a maintained award may only be provided to a specific player, an award triggering event may only occur in association with that specific player. In these embodiments, the gaming system interacts differently with different players such that, during the limited duration, an award triggering event may occur in association with a specific player but the award triggering event may not occur in association with the remaining players. For example, while the gaming system holds constant the probability of winning the maintained award for the specific player, the gaming system temporarily modifies the probability of the remaining players winning the maintained award to 0% such that these remaining players cannot win the maintained award. In operation of these embodiments, since the award triggering event may only occur, during the limited duration, with a specific player, if the award triggering event occurs, the gaming system causes the current value of the maintained award to be provided to the specific player associated with the limited duration of exclusivity.

In certain embodiments, for a limited duration during which a maintained award may only be provided to a specific player, an award triggering event may occur in association with any player. In these embodiments, based on the player whom the award triggering event occurred in association with, the gaming system operates to either provide the award to that player, provide an alternative award to that player or not provide any award to that player. As such, while an award triggering event of these embodiments may occur in association with any player (and not just the specific player temporarily exclusively associated with the maintained award), which award, if any, that is provided responsive to the occurrence of the award triggering event is based on whether or not the player is or is not associated with the limited duration of exclusivity.

In certain embodiments, in addition to periodically limiting which players may win a maintained award, upon an occurrence of an award triggering event associated with a maintained award, the gaming system determines if that maintained award is associated with any temporary duration during which that maintained award is limited to be provided to a specific player. In these embodiments, if that maintained award is not associated with any temporary duration during which that maintained award is limited to be provided to a specific player, the gaming system causes the current value of that maintained award to be provided. For example, upon a progressive award triggering event occurring in association with an unlocked progressive award (i.e., a progressive award not exclusively available only to a specific player), the gaming system causes the current value of the progressive award to be provided to whichever player was associated with the progressive award triggering event.

On the other hand, if, when an award triggering event occurs, the maintained award is associated with a temporary duration during which that maintained award is limited to be provided to a specific player, the gaming system determines if the player associated with the occurrence of the award triggering event is the specific player associated with the maintained award for the temporary duration. That is, if only one player is currently eligible to win the maintained award, the gaming system determines whether or not the award triggering event occurred in association with that one player. If the gaming system determines that the player associated with the occurrence of the award triggering event is the specific player associated with the maintained award for the temporary duration, the gaming system causes the current value of that maintained award to be provided to the specific player. For example, upon a progressive award triggering event occurring in association with a locked progressive award (i.e., a progressive award exclusively available only to a specific player), upon a determination that the specific player won the progressive award, the gaming system causes the current value of the progressive award to be provided to that player.

In certain embodiments, if the gaming system determines that the player associated with the occurrence of the award triggering event is not the specific player associated with the maintained award for the temporary duration, the gaming system does not provide any award to that player in association with the occurrence of the award triggering event. Such embodiments create a near-miss phenomenon for the player whom would have won the maintained award if only they were exclusively associated with the award when the award triggering event occurred. For example, upon a progressive award triggering event occurring in association with a progressive award locked as temporally eligible to be won only by a first player, upon a determination that the progressive award triggering event occurred in association with a second, different player, the gaming system does not provide the progressive award to that second player.

In certain embodiments, if the gaming system determines that the player associated with the occurrence of the award triggering event is not the specific player associated with the maintained award for the temporary duration, the gaming system does not provide the maintained award to that player but rather provides another award to that player. For example, upon an occurrence of a progressive award exclusivity event associated with a progressive award, the specific player whom the progressive award exclusivity event occurred in association with continues to play for the incremented value of that progressive award and, for a limited duration, the remaining players play for a reset value of that progressive award. In this example, upon a progressive award triggering event occurring in association with one of the remaining players during the limited duration, the gaming system provides to that player the reset value of the progressive award (or the reset value of the progressive award incremented by a portion of the progressive award contributions made during the limited duration).

In certain embodiments, rather than deeming certain players ineligible to win an award during a limited duration following an occurrence of an award exclusivity event, the gaming system selectively employs one or more supplemental award pools, such as a hidden progressive award, during the limited duration following the occurrence of the progressive award exclusivity event. In these embodiments, each of the players remain eligible to win the award during the limited duration but only an individual player is eligible to also win the supplemental award pool during the limited duration. For example, upon a progressive award exclusivity event occurring in association with a maintained progressive award for a first player, for a limited period of time, the gaming system modifies, based on a reserve pool of funds, the value of the maintained progressive award for first player without modifying the value of the maintained progressive award for any other player. In this example, upon a progressive award triggering event occurring in association with the first player, that player wins the modified value of the progressive award and upon a progressive award triggering event occurring in association with a second, different player, that second player wins the unmodified value of the progressive award.

Accordingly, unlike prior gaming systems that operated in a static mode of operation in which the same progressive award is always available to all players, the gaming system of the present disclosure employs various modes of operation by periodically providing that the same progressive award is only available to certain players. For example, responsive to an occurrence of a progressive award exclusivity event for a first player, the gaming system operates in a first mode for the benefit of that first player and responsive to an occurrence of a progressive award exclusivity event for a second, different player, the gaming system operates in a second, different mode for the benefit of that second player.

In addition to improving how the gaming system operates by employing multiple different modes of operations, the gaming system of the present disclosure introduces an improved user interface by displaying different attributes of an award to different players during different periods of time. For example, during a limited duration in which a progressive award may only be won by a specific player, the gaming system displays different information to the remaining players regarding the progressive award and whom it is locked for, for long it is locked for and how that player may attempt to lock the progressive award for their benefit going forward. Such displayed information counteracts any potential fatigue that these other players may incur (based on not wanting to continue playing for an award temporarily unavailable to be won) thereby leading to a more efficient operation of the gaming system by reducing idle time whereby the gaming system still consumes power and generates heat without otherwise being used.

While certain embodiments described below are directed to an award triggering event occurring in association with one or more plays of a secondary game, such as a bonus game, it should be appreciated that such embodiments may additionally or alternatively be employed in association with an award triggering event occurring in association with one or more plays of a primary game, such as a wagering game. Moreover, while certain embodiments described below are directed to an award triggering event that occurs in association with an electronic gaming machine ("EGM") such as a slot machine, a video poker machine, a video lottery terminal, a terminal associated with an electronic table game, a terminal associated with a live table game, a video keno machine, a video bingo machine and/or a sports betting terminal that offers sports betting opportunities, it should be appreciated that such embodiments may additionally or alternatively be employed in association with an award triggering event that occurs in association with a personal gaming device, such as desktop computers, laptop computers, tablet computers or computing devices, personal digital assistants, mobile phones, and other mobile computing devices that offer plays of wagering games (and in certain instances, sports betting opportunities). Furthermore, while the player's credit balance, the player's wager, and any awards are displayed as an amount of monetary credits or currency, in certain of the embodiments described below, one or more of such player's credit balance, such player's wager, and any awards provided to such a player may be for non-monetary credits, promotional credits, and/or player tracking points or credits.

FIG. 1 is a flowchart of an example process or method of operating the gaming system of the present disclosure. In various embodiments, the process is represented by a set of instructions stored in one or more memories and executed by one or more processors. Although the process is described with reference to the flowchart shown in FIG. 1, many other processes of performing the acts associated with this illustrated process may be employed. For example, the order of certain of the illustrated blocks or diamonds may be changed, certain of the illustrated blocks or diamonds may be optional, or certain of the illustrated blocks or diamonds may not be employed.

In various embodiments, the gaming system maintains a progressive award as indicated in block 102. In certain embodiments, the award is a stand-alone progressive award associated with a single EGM. In certain embodiments, the award is part of a plurality of progressive awards maintained in a multi-level progressive award configuration ("MLP") associated with a single EGM. In certain embodiments, the award is a stand-alone progressive award associated with a plurality of EGMs. In certain embodiments, the award is part of a plurality of progressive awards maintained in an MLP associated with a plurality of EGMs. In different embodiments wherein the award is associated with a plurality of EGMs, the EGMs may be in (or otherwise associated with) a single gaming establishment (such that the progressive award may be considered a local area progressive ("LAP")) or the EGMs may be in (or otherwise associated with) two or more different gaming establishments (such that the progressive award may be considered a wide area progressive ("WAP")).

The maintained award is associated with a reset value utilized following a progressive award triggering event. In certain embodiments wherein the gaming system maintains a plurality of progressive awards, each of the progressive awards maintained by the gaming system have the same progressive award reset value. In certain embodiments wherein the gaming system maintains a plurality of progressive awards, two or more of the progressive awards maintained by the gaming system have different progressive award reset values.

The maintained progressive award is also associated with a progressive award contribution rate that represents, in certain instances, the portion of each wager placed (or the portion of each designated wager, such as a maximum wager, placed) that is allocated to the progressive award. In certain embodiments wherein the gaming system maintains a plurality of progressive awards, each of the progressive awards maintained by the gaming system have the same progressive award contribution rate. In certain embodiments wherein the gaming system maintains a plurality of progressive awards, two or more of the progressive awards maintained by the gaming system have different progressive award contribution rates.

In certain embodiments, the maintained progressive award is associated with a range of values, wherein the low end of the range of values represents the reset value of the progressive award and the high end of the range of values represents the maximum amount which the progressive award may reach. In these embodiments, the amount which the progressive award may be incremented to is capped or limited by the highest value in the value range associated with such progressive award. In these embodiments, the gaming system determines a progressive award hit value from the value range associated with the progressive award and displays the current value of the progressive award and/or the maximum amount which the progressive award may reach. In other embodiments, the progressive award is not associated with any range of values. In this embodiment, the progressive award continues to be incremented until a progressive award triggering event occurs.

In addition to maintaining the progressive award, the gaming system determines if a progressive award increment event has occurred in association with the maintained progressive award as indicated in diamond 104. In one such embodiment, the progressive award increment event occurs based on (or as a result of) a wager being placed on a play of a game at an EGM associated with that award. In another such embodiment, the progressive award increment event additionally or alternatively occurs based on (or as a result of) a side wager being placed at an EGM associated with that award. In another such embodiment, the progressive award increment event additionally or alternatively occurs based on (or as a result of) one or more displayed events occurring in association with one or more plays of one or more games. For example, the display of one or more symbols during a play of a game results in an occurrence of a progressive award increment event. In another such embodiment, the progressive award increment event occurs independent of any displayed events associated with any plays of any games. For example, a gaming establishment may periodically cause an occurrence of a progressive award increment event with funds drawn from the gaming establishment marketing department.

If the gaming system determines that a progressive award increment event occurred, the gaming system increases a current value of the maintained progressive award as indicated in block 106. In certain embodiments wherein the progressive award increment event occurs based on a placed wager, the increase of the maintained award is funded by a portion of the wager placed (e.g., a progressive award contribution rate of 1% of the amount of the wager placed is allocated to growing the progressive award). In certain other embodiments wherein the progressive award increment event occurs based on a placed side wager, the increase of the maintained award is funded by part or all of the side wager placed (e.g., a progressive award contribution rate of 50% of the amount of the side wager placed is allocated to growing the progressive award). In certain other embodiments, the gaming system utilizes an amount provided by one or more marketing and/or advertising departments, such as a gaming establishment marketing department, to fund part or all of the increase of the maintained award upon an occurrence of a progressive award increment event.

In addition to increasing the progressive award (if the progressive award increment event occurs) or maintaining the progressive award (if no progressive award increment event occurs), the gaming system determines if a progressive award exclusivity event has occurred in association with the progressive award for a specific player as indicated in diamond 108 of FIG. 1. In these embodiments, in addition to periodically growing the value of one or more progressive awards, the gaming system determines whether any event occurred (or any event failed to occur) that resulted in the availability of one or more of such progressive awards being locked for the benefit of a certain player.

In certain embodiments, a progressive award exclusivity event occurs based on one or more displayed events occurring in association with one or more plays of one or more games. In certain embodiments, a progressive award exclusivity event occurs based on a specific player achieving a certain outcome, such as obtaining one of more outcomes associated with a specific win category (e.g., winning a royal flush). In certain other embodiments, a progressive award exclusivity event occurs based on a specific player winning a certain amount from a play of a single game or winning a certain amount over a period of time. In certain other embodiments, a progressive award exclusivity event occurs based on a specific player maintaining an active gaming session for a certain amount of time and/or over a certain quantity of games played.

In certain embodiments, a progressive award exclusivity event occurs in association with a competition amongst multiple players. In these embodiments, a plurality of players participate in one or more sequence in which a progressive award exclusivity event occurs in association with the winning player. For example, a group of players at EGMs at a bank each play a wheel spin bonus in which a progressive award exclusivity event occurs in association with the player with the highest result from their wheel spin.

In certain embodiments, a progressive award exclusivity event occurs independent of any displayed events associated with any plays of any games. In one embodiment, a progressive award exclusivity event randomly occurs in association with a specific player. In one such embodiment, the gaming system randomly determines if a progressive award exclusivity event occurs and then randomly determines a player for that progressive award exclusivity event to occur in association with. In another such embodiment, the gaming system randomly determines a player and then randomly determine if a progressive award exclusivity event occurs in association with that player.

In certain embodiments, one or more actions (or inactions) undertaken by a player at least partially determines a probability of a progressive award exclusivity event occurring in association with that player. In certain embodiments, a progressive award exclusivity event occurs based on a specific player wagering a certain amount over a period of time. In other embodiments, a progressive award exclusivity event occurs based on a player participating in one or more offerings available to the player. For example, a player that has signed up for a cashless wagering account is associated with a first probability of a progressive award exclusivity event occurring in association with that player and a player that has not signed up for any cashless wagering account is associated with a second, different probability of a progressive award exclusivity event occurring in association with that player. In certain embodiment, each player has the same probability of a progressive award exclusivity event occurring in association with that player.

In another embodiment, a progressive award exclusivity event occurs as part of a gaming establishment promotion, such as a player redeeming an award lock ticket that causes a progressive award exclusivity event to occur. In one such embodiment, the award lock ticket comprises a physical ticket provided to a player and redeemed at an EGM, such as by inserting the award lock ticket into a bill validator of the EGM and/or scanning a machine-readable code printed on the award lock ticket at the EGM. In another such embodiment, the award lock ticket comprises a virtual ticket communicated to a mobile device of a player and redeemed at an EGM in association with the mobile device pairing with the EGM and communicating data associated with the award locket ticket to the EGM.

In another embodiment, a progressive award exclusivity event occurs based on a specific player purchasing an occurrence of the event using one or more of an amount of funds, an amount of virtual currency and/or an amount of player tracking points. In one such embodiment, a progressive award exclusivity event occurs based on a player purchasing such an event for a static fee (in the form of an amount of funds, an amount of virtual currency and/or an amount of player tracking points). In another such embodiment, a progressive award exclusivity event occurs based on a player purchasing such an event for a dynamic fee (in the form of an amount of funds, an amount of virtual currency and/or an amount of player tracking points) set via an auction in which players bid on obtaining exclusivity of an award for a limited duration.

In certain embodiments in which the system maintains a plurality of awards, different maintained awards have different purchase prices of a progressive award exclusivity event occurring in association with that award. In certain embodiments in which the system maintains a plurality of awards, each award has the same purchase price of a progressive award exclusivity event occurring in association with that award. In certain embodiments, a probability of winning an award at least partially determines a purchase price of a progressive award exclusivity event occurring in association with that award. In certain embodiments, a current value (and/or a reset value) of a progressive award at least partially determines a purchase price of a progressive award exclusivity event occurring in association with that progressive award.

In certain embodiments, different players have different probabilities of a progressive award exclusivity event occurring in association with that player. In certain such embodiments, a player's status (as determined by a gaming establishment patron management system, such as a player tracking system) at least partially determines a probability of a progressive award exclusivity event occurring in association with that player. In these embodiments, different players of different statuses are associated with different probabilities of a progressive award exclusivity event occurring in association with that player. For example, all players associated with a player tracking status (or alternatively all players regardless of being assigned a player tracking status) are eligible to be associated with an occurrence of a progressive award exclusivity event, but the probability of such a progressive award exclusivity event occurring in association with such different players varies based on each player's respective player tracking status. In another example, certain players of certain player tracking statuses are eligible to be associated with an occurrence of a progressive award exclusivity event while certain other players of certain other player tracking statuses (or not player tracking status) are ineligible to be associated with an occurrence of a progressive award exclusivity event.

In another embodiment, a progressive award exclusivity event occurs or is otherwise enabled based on a current state of a gaming establishment. For example, upon the gaming system determining that gaming activity at a gaming establishment is currently lower than expected, the gaming system enables the occurrence of one or more progressive award exclusivity events for a set amount of time or until the gaming system determines that the level of gaming activity at the gaming establishment is more in line with expectations.

In certain embodiments in which the system maintains a plurality of progressive awards, different maintained progressives awards have different probabilities of a progressive award exclusivity event occurring in association with that progressive award. In certain embodiments in which the system maintains a plurality of progressive awards, each progressive award has the same probability of a progressive award exclusivity event occurring in association with that progressive award. In certain embodiments, a current value (and/or a reset value) of the progressive award at least partially determines a probability of a progressive award exclusivity event occurring in association with that progressive award. In certain embodiments, a probability of winning a progressive award at least partially determines a probability of a progressive award exclusivity event occurring in association with that progressive award.

In certain embodiments, the gaming system enables a progressive award exclusivity event to occur in association with each of the maintained awards. In certain embodiments, the gaming system enables a progressive award exclusivity event to occur in association with certain of, but not each of, the maintained awards. In certain embodiments, the gaming system requires an award exclusivity enablement event to occur in association with a maintained award for that award to potentially be exclusively associated with a specific player. In one such embodiment, the gaming system enables players currently playing for an award to vote to enable the temporary locking of that award. In this embodiment, if all (or at least a threshold percentage) of the players decide to enable the feature, the gaming system makes such a feature available. In another such embodiment, the gaming system enables players currently playing for an award to vote to disable the temporary locking of that award. In this embodiment, if all (or at least a threshold percentage) of the players decide to disable the feature, the gaming system makes such a feature unavailable.

If the gaming system determines a progressive award exclusivity event occurs for a specific player, the gaming system associates the progressive award with that specific player for a period of exclusivity as indicated in block 110. Such an association provides that the progressive award may be won by that specific player and only that specific player during the period of exclusivity. That is, responsive to a progressive award exclusivity event occurring for a particular player, the gaming system isolates that particular progressive award for that particular player and prevents or otherwise locks other players from being eligible to win that specific instance of that progressive award until the period of exclusivity expires.

Figure 2A:
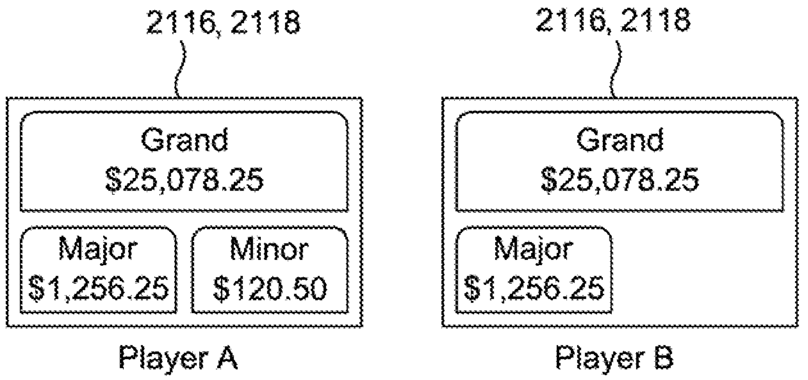
FIGS. 2A, 2B, 2C, 2D and 2E are front views of one embodiment of the gaming system of the present disclosure illustrating the current values of a progressive award displayed to different players during a period of exclusivity for that progressive award.

In certain embodiments, when associating an award with a specific player for a period of exclusivity, the gaming system continues to display the award to that specific player but ceases to display the award to the remaining players. For example, as seen in FIG. 2A, following the gaming system associating the minor progressive award valued at $120.50 with Player A, the gaming system causes the display device of the EGM being played by that specific player to display the minor progressive award valued at $120.50 and causes the display device of an EGM being played by Player B (i.e., another player not associated with any exclusivity of winning the minor progressive award) to not even show the minor progressive award valued at $120.50.

Figure 2B:
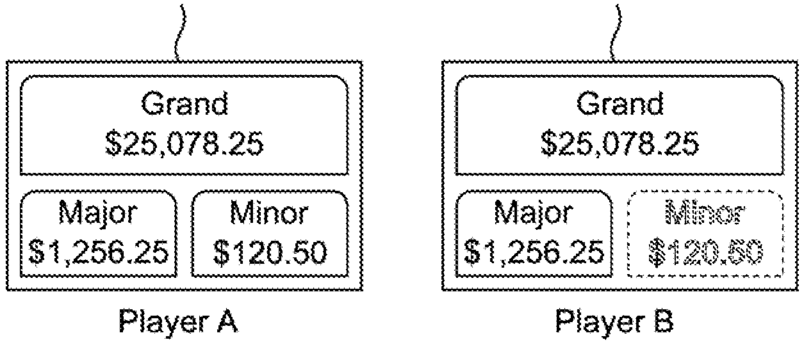

In certain embodiments, when associating an award with a specific player for a period of exclusivity, the gaming system continues to display the award to that specific player but modifies the display of the award to the remaining players. For example, as seen in FIG. 2B, following the gaming system associating the minor progressive award valued at $120.50 with Player A, the gaming system causes the display device of the EGM being played by that specific player to display the minor progressive award valued at $120.50 and causes the display device of an EGM being played by Player B (i.e., another player not associated with any exclusivity of winning the minor progressive award) to display the minor progressive award valued at $120.50 as disabled.

Figure 2C:
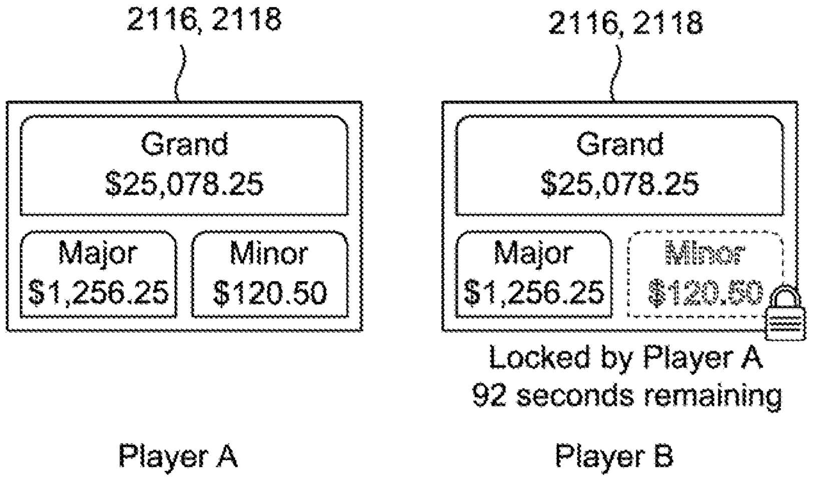

In certain embodiments, when associating an award with a specific player for a period of exclusivity, the gaming system continues to display the award to that specific player but modifies the display of the award to the remaining players and provides such remaining players additional information regarding their ineligibility to win that award during the period of exclusivity, such as by displaying the player and/or EGM whom the award is currently exclusively associated with. For example, as seen in FIG. 2C, following the gaming system associating the minor progressive award valued at $120.50 with Player A, the gaming system causes the display device of the EGM being played by that specific player to display the minor progressive award valued at $120.50 and causes the display device of an EGM being played by Player B (i.e., another player not associated with any exclusivity of winning the minor progressive award) to display the minor progressive award valued at $120.50 as disabled from being won for the next 92 seconds because such a progressive award is currently locked by Player B. It should be appreciated that while illustrated as a player interfacing with an EGM to lock an award and/or a display device of an EGM to display information associated with one or more locked awards, the system utilizes a mobile device running a mobile device application, a kiosk, a service window (e.g., a remote host controlled service window displayed by an EGM), and/or a component of a gaming establishment patron management system (e.g., a player tracking unit) to lock an award and/or display information associated with one or more locked awards.

Figure 3A:
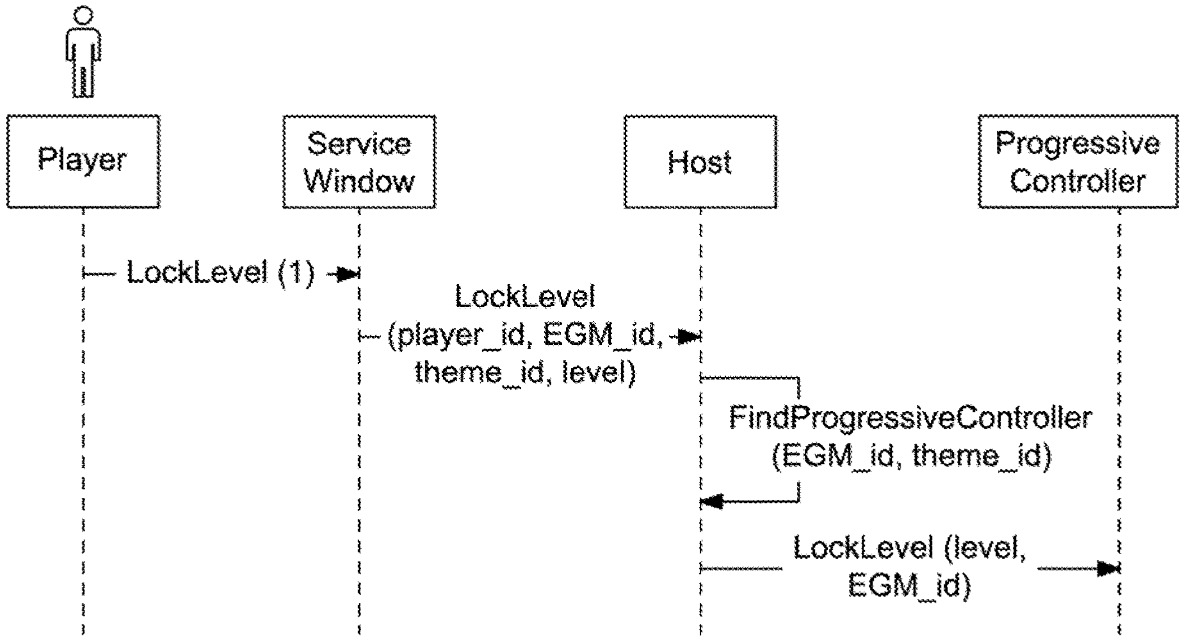
FIG. 3A is a flow chart of an example process for operating the gaming system upon an occurrence of a progressive award exclusivity event.

In certain embodiments, upon a progressive award exclusivity event occurring in association with a specific player, the gaming system modifies how it operates to temporarily vary the attributes associated with one or more awards and/or one or more players. For example, as seen in FIG. 3A, following a player interfacing with a service window displayed by an EGM to request the temporary locking of a progressive award in association with that player, the host controlling the service window operates with the progressive controller to potentially temporarily lock the progressive award. In this example, via communicating using one or more gaming protocols (e.g., SAS and/or G2S protocols), the host requests that the progressive controller modify the parameters of the progressive award to only being eligible to be won by the requesting player during the period of exclusivity associated with the request.

In certain embodiments, the period of exclusivity is based on time. In certain such embodiments, the gaming system associates a specific award as eligible to be won only by a specific player until a period of time expires (e.g., for the next fifteen minutes, a specific level of an MLP configuration can only be won by a specific player). In certain other embodiments, the gaming system associates a specific award as eligible to be won only by a specific player until a certain time of day (e.g., until 3:00 PM, a progressive award can only be won by a specific player).

In certain embodiments, the period of exclusivity is based on an interval measured by a quantity of events occurring. In certain such embodiments, the quantity of events include a number of games played by the specific player (e.g., for the next ten games played by a specific player, a specific level of an MLP configuration can only be won by that specific player). In certain such embodiments, the quantity of events include a number of games played by any player (e.g., for the next one-hundred games played by players playing for a progressive award, a specific player, that progressive award can only be won by a specific player).

In certain such embodiments, the period of exclusivity is based on an interval measured by an accumulation. In certain such embodiments, the accumulation includes an amount of wagers placed by the specific player and/or an amount of money won by the specific player (e.g., until a specific player wagers $100, a specific level of an MLP configuration can only be won by that specific player). In certain such embodiments, the accumulation includes an amount of wagers placed by any player playing for the award and/or an amount of money won by any player playing for the award.

In certain embodiments, the period of exclusivity is based on two or more of an amount of time, a quantity of events occurring and/or an accumulation. For example, the gaming system associates a specific award as eligible to be won only by a specific player until a period of time expires or a quantity of games are played, whichever comes first. In certain other embodiments, the gaming system associates a specific award as eligible to be won only by a specific player until a certain time of day or a quantity of games are played, whichever comes first.

In certain such embodiments, the period of exclusivity is based on an occurrence (or lack thereof) of another event. In certain embodiments, the period of exclusivity continues until the period of exclusivity lapses, such as upon an expiration of an amount of time associated with the period of exclusivity or upon a play of the last game of a quantity of plays of a game associated with the period of exclusivity. In certain such embodiments, the period of exclusivity continues until the specific player associated with the progressive award exclusivity event requests to no longer be exclusively associated with the award. In certain other embodiments, the period of exclusivity continues until the specific player associated with the progressive award exclusivity event terminates a gaming session, such as by cashing out from the EGM and/or logging out of the EGM. In certain other embodiments, the period of exclusivity continues until the specific player associated with the progressive award exclusivity event changes game themes as part of the gaming session. In certain such embodiments, if the player attempts to change game themes during the period of exclusivity, the gaming system prevents such a change until the period of exclusivity expires. In certain other embodiments, if the player changes game themes during the period of exclusivity, the gaming system employs an externally controlled interface, such as a service window, to warn the player that they should return back to the game theme associated with the period of exclusivity.

In certain other embodiments, the period of exclusivity continues until the award associated with the progressive award exclusivity event is provided to the specific player associated with the progressive award exclusivity event. In certain other embodiments, the period of exclusivity continues until any designated award is provided (e.g., the period of exclusivity lasts for a specific progressive award of an MLP configuration until any of the progressive awards of the MLP configuration are provided). In these embodiments, the period of exclusivity is terminated or otherwise affected by the locked award (or a related award, such as another award of the MLP configuration) being provided. In certain other embodiments, the period of exclusivity continues beyond the award associated with the progressive award exclusivity event is provided to the specific player associated with the progressive award exclusivity event. In certain other embodiments, the period of exclusivity continues beyond any designated award is provided (e.g., the period of exclusivity lasts for a specific progressive award of an MLP configuration until any of the progressive awards of the MLP configuration are provided). In these embodiments, the period of exclusivity is not otherwise affected by the locked award (or a related award, such as another award of the MLP configuration) being provided.

In various embodiments, when the period of exclusivity associated with a specific player concludes (i.e., when an exclusive award release event occurs), the gaming system removes the association of the maintained award with that specific player. In these embodiments, the removal of the exclusive association between a specific player and the maintained award results in any player (and not just the specific player) again being eligible to win the maintained award.

In certain embodiments, once a progressive award exclusivity event has occurred for a specific player, during the limited duration in which the progressive award is exclusivity associated with that specific player, no more progressive award exclusivity events may occur in association with that progressive award and/or that specific player. In these embodiments, until the completion of the limited duration, that award remains exclusively locked in association with a specific player and the gaming system bypasses any subsequent determinations, during the limited duration, of whether or not a progressive award exclusivity event has occurred in association with the progressive award. In certain embodiments, once a progressive award exclusivity event has occurred for a specific player, during the limited duration in which the progressive award is exclusivity associated with that specific player, additional progressive award exclusivity events may occur in association with that progressive award and/or that specific player. In these embodiments, prior to the completion of the limited duration, that award remains non-exclusively locked in association with a specific player and the gaming system continues with zero, one or more subsequent determinations, during the limited duration, of whether or not a progressive award exclusivity event has occurred in association with the progressive award.

In addition temporarily associating the maintained progressive award with a specific player (if the gaming system determines a progressive award exclusivity event occurs for that specific player and the period of exclusivity has not expired) or if no progressive award exclusivity event occurs, the gaming system determines if a progressive award triggering event has occurred in association with the maintained progressive award as indicated in diamond 112 of FIG. 1. In certain embodiments, a progressive award triggering event occurs based on one or more displayed events associated with one or more plays of one or more games. In certain embodiments, a progressive award triggering event occurs independent of any displayed events associated with any plays of any games.

It should be appreciated that, in certain embodiments, for a limited duration during which a maintained progressive award may only be provided to a specific player, a progressive award triggering event may only occur in association with that specific player. In these embodiments, for a period of exclusivity during which a progressive award is exclusively associated with a specific player, the gaming system modifies how it interacts with different players such that a progressive award triggering event may occur in association with a specific player but the progressive award triggering event may not occur in association with the remaining players (i.e., the gaming system temporarily associates a 0% of the progressive award triggering event occurring with these remaining players). In these embodiments, during the period of exclusivity in which the progressive award is exclusively associated with a specific player, the determination of whether or not the progressive award triggering event occurs is effectively a determination of whether or not the progressive award triggering event occurs for that specific player (as the progressive award triggering event cannot occur in association with the remaining players).

If the gaming system determines that no progressive award triggering event occurred in association with the maintained progressive award, the gaming system returns to block 104 and, as described above, determines if a progressive award increment event has occurred in association with the maintained progressive award. For example, if a progressive award triggering event occurs based on the current value of the progressive award reaching a randomly determined progressive award hit value, responsive to a determination that the current value of the progressive award is below the randomly determined progressive award hit value, the gaming system determines that no progressive award triggering event occurred and again determines whether or not to increase the current value of the progressive award based on the occurrence of zero, one or more events. In another example, if a progressive award triggering event occurs based on the determination and display of a symbol (or symbol combination) during a play of a game, responsive to a determination that the symbol (or symbol combination) did not occur during the play of the game, the gaming system determines that no progressive award triggering event occurred and again determines whether or not to increase the current value of the progressive award based on the occurrence of zero, one or more events.

On the other hand, if the gaming system determines that a progressive award triggering event occurred in association with the maintained progressive award, as indicated in block 114, the gaming system causes the current value of the maintained progressive award to be provided to the player associated with the occurrence of the progressive award triggering event. In these embodiments, whether or not the progressive award is provided to a specific player exclusively associated with that progressive award during a period of exclusivity is based on whether or not the progressive award triggering event occurred during the period of exclusivity. That is, during the period of exclusivity, the progressive award triggering event may only occur in association with a specific player and outside of the period of exclusivity, the progressive award triggering event may occur in association with any player. In different embodiments, the gaming system causes the current value of the progressive award to be provided or otherwise made available via any of, but not limited to, an increase of a credit meter of an EGM, a handpay by gaming establishment personnel of the current value of the progressive award, and an increase of a balance of an account, such as a cashless wagering account, associated with a player.

In one such embodiment if, during a period of exclusivity associated with a specific player, a progressive award triggering event occurs based on the determination and display of a designated symbol (or designated symbol combination) during a play of a game by that specific player, the gaming system determines that a progressive award triggering event occurred for that specific player. It should be appreciated that in this embodiment, during the period of exclusivity associated with a specific player, the designated symbol (or designated symbol combination) cannot occur in association with a play of a game for any player besides the specific player.

In another embodiment, if, during a period of exclusivity associated with a specific player, a progressive award triggering event occurs based on the current value of the progressive award reaching a randomly determined progressive award hit value, then following the placement of a wager which caused a progressive award increment event to occur and the current value of the progressive award to increase such that the now current value of the progressive award has reached the randomly determined progressive award hit value, the gaming system determines that the progressive award triggering event occurred and causes the progressive award to be made available to the specific player. In one such embodiment, the wager placed that caused the progressive award increment event to occur and the current value of the progressive award to increase to the randomly determined progressive award hit value must be placed by the specific player for the specific player to win the progressive award. In this embodiment, if another player placed the wager that caused the progressive award increment event to occur and the current value of the progressive award to increase to the randomly determined progressive award hit value, the gaming system randomly selects another progressive award hit value to avoid providing that other player the progressive award. In another such embodiment, the wager placed that caused the progressive award increment event to occur and the current value of the progressive award to increase to the randomly determined progressive award hit value may be placed by any player (i.e., the specific player or any of the other players) for the specific player to win the progressive award.

Following causing the current value of the progressive award to be made available responsive to the occurrence of the progressive award triggering event, the gaming system resets the value of the progressive award to the reset value associated with the progressive award as indicated in block 116. In these embodiments, upon an occurrence of a progressive award reset event, the gaming system resets the value of the progressive award to a reset or base value. In one such embodiment, the occurrence of the progressive award reset event qualifies as an exclusive award release event to conclude any period of exclusivity between a specific player and the progressive award. In another such embodiment, the occurrence of the progressive award reset event does not qualify as an exclusive award release event such that any period of exclusivity between a specific player and the progressive award continues independent of the progressive award triggering event and the corresponding progressive award reset event. In these different embodiments, following the reset of the value of the progressive award to the reset value associated with the progressive award, the gaming system returns to diamond 104 and again determines if a progressive award increment event has occurred in association with the maintained progressive award.

It should be appreciated that while generally described as a progressive award exclusivity event occurring in association with a specific player, such a progressive award exclusivity event and/or a period of exclusivity may additionally or alternatively occur in association with a specific group of players. For example, if a progressive award exclusivity event occurs in association with a first player, that first player may decide to lock a specific award for themselves and up to a certain quantity of additional players that each may win that specific award during the period of exclusivity (while other players may not). Additionally, while generally described as a progressive award exclusivity event occurring in association with a specific award, such as a specific level of an MLP configuration, such a progressive award exclusivity event and/or a period of exclusivity may additionally or alternatively occur in association with a plurality of awards, such as multiple levels (or each level) of an MLP configuration.

Accordingly, unlike prior gaming systems that operated in a static mode of operation in which the same progressive award is always available to all players, the gaming system of the present disclosure employs various modes of operation by periodically providing that the same progressive award is only available to certain players. For example, responsive to an occurrence of a progressive award exclusivity event for a first player, the gaming system operates in a first mode for the benefit of that first player and responsive to an occurrence of a progressive award exclusivity event for a second, different player, the gaming system operates in a second, different mode for the benefit of that second player.

In certain embodiments, rather than a progressive award triggering event only being enabled to occur in association with a specific player for a limited duration, for a limited duration during which a maintained award may only be provided to a specific player, a progressive award triggering event may occur in association with any player. In these embodiments, based on the player whom the progressive award triggering event occurred in association with, the gaming system operates to either provide the award to that player or provide an alternative award to that player. As such, while a progressive award triggering event of these embodiments may occur in association with any player, the award, if any, provided responsive to the occurrence of the progressive award triggering event is based on whether or not the player is or is not associated with the limited duration of exclusivity.

Figure 3B:
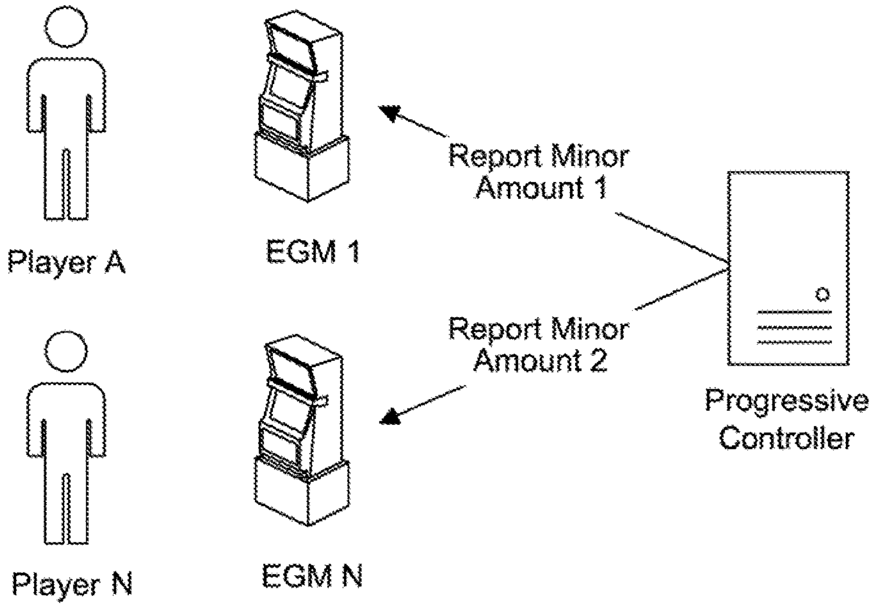
FIG. 3B is a diagram illustrating how a progressive controller interacts with different electronic gaming machines differently following an occurrence of a progressive award exclusivity event.

In certain embodiments, if the gaming system determines a progressive award exclusivity event occurs for a specific player, the gaming system associates a first instance of that award with that specific player for a period of exclusivity and further associates a second instance of that award with the remaining players for the period of exclusivity. For example, the gaming system exclusively associates the incremented instance of a progressive award with a first player for a duration of time (such that only the first player may win the incremented value of the progressive award during the duration of time) and the gaming system associates a non-incremented instance of the progressive award (i.e., the reset value of the progressive award) with the remaining players for the duration of time (such that the remaining players may win the reset value of the progressive award during the duration of time). In this example, as seen in FIG. 3B, following an occurrence of a progressive award exclusivity event for a specific player, the gaming system, and more specifically the progressive controller tasked with maintaining the progressive award, reports different values of that progressive award to different EGMs such that the specific player continues to play for the incremented value of that progressive award during the period of exclusivity and one or more remaining players continue to play for the non-incremented value of that progressive award during the period of exclusivity. Such dual associations provide that a first version of an award may be won by a specific player and only that specific player during the period of exclusivity while one or more other versions of that award may be won by other players during the period of exclusivity.

Figure 2D:
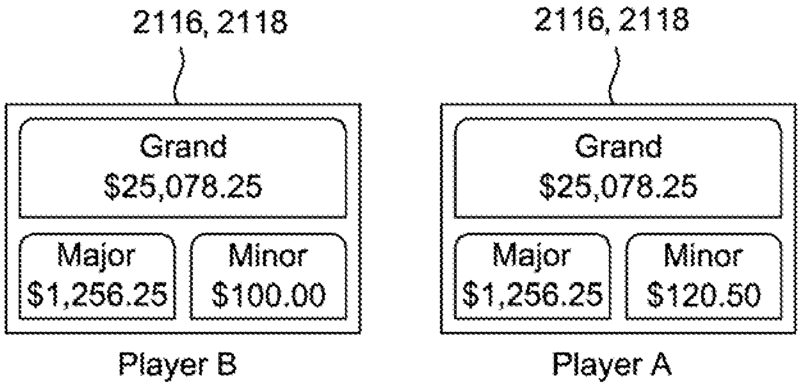

In certain embodiments, when associating an award with a specific player for a period of exclusivity, the gaming system displays one version of that award to that specific player and displays another version of that award to the remaining players. For example, as seen in FIG. 2D, following the gaming system associating the minor progressive award valued at $120.50 with Player A, the gaming system causes the display device of the EGM being played by that specific player to display the minor progressive award valued at $120.50 and causes the display device of an EGM being played by Player B (i.e., another player not associated with any exclusivity of winning the minor progressive award) to show the minor progressive award valued at a reset value of $100.00. In certain embodiments, when associating one version of an award with a specific player for a period of exclusivity and associating another version of that award with one or more other players for the period of exclusivity, the gaming system displays both versions of the award to the other players and provides such remaining players additional information regarding their ineligibility to win that award during the period of exclusivity, such as by displaying the player and/or EGM whom the award is currently exclusively associated with.

In certain embodiments in which the gaming system modifies which version of an award certain players play for during a period of exclusivity, the gaming system causes any incrementation of the award during the period of exclusivity to fund the version of the award being played for by the specific player that the progressive award exclusivity event occurred in association with. For example, if, during a period of time following a progressive award exclusivity event occurring, Player A is playing for the incremented version of a progressive award while the remaining players play for the reset value version of the progressive award, any contributions to the progressive award during the period of time are allocated to increase the value of the progressive award being played for by Player A.

In certain embodiments in which the gaming system modifies which version of an award certain players play for during a period of exclusivity, the gaming system causes any incrementation of the award during the period of exclusivity to fund the version of the award being played for by the remaining players which the progressive award exclusivity event did not occur in association with. For example, if, during a period of time following a progressive award exclusivity event occurring, Player A is playing for the incremented version of a progressive award while the remaining players play for the reset value version of the progressive award, any contributions to the progressive award during the period of time are allocated to increase the value of the reset progressive award being played for by the remaining players.

In certain embodiments in which the gaming system modifies which version of an award certain players play for during a period of exclusivity, the gaming system causes any incrementation of the award during the period of exclusivity to fund the respective version of the award being played for by that respective player. For example, if, during a period of time following a progressive award exclusivity event occurring, Player A is playing for the incremented version of a progressive award while the remaining players play for the reset value version of the progressive award, any contributions to the progressive award made by Player A during the period of time are allocated to increase the value of the progressive award being played for by Player A and any contributions to the progressive award made by the remaining players during the period of time are allocated to increase the value of the reset progressive award being played for by the remaining players.

It should be appreciated by enabling different players to play for different instances of an award during a period of exclusivity, if a progressive award triggering event occurs during that period of exclusivity, the gaming system determines if the player associated with the occurrence of the progressive award triggering event is the specific player associated with the maintained progressive award for the temporary duration. That is, if only one player is currently eligible to win a specific instance of a maintained progressive award, the gaming system determines whether or not the progressive award triggering event occurred in association with that one player. If the gaming system determines that the player associated with the occurrence of the progressive award triggering event is the specific player associated with the maintained progressive award for the temporary duration, the gaming system causes the current value of that maintained progressive award to be provided to the specific player. On the other hand, if the gaming system determines that the player associated with the occurrence of the progressive award triggering event is not the specific player associated with the maintained progressive award for the temporary duration, the gaming system provides an alternative award to that player, such as an alternative reset version of the award to that player. For example, upon a progressive award triggering event occurring in association with one of the remaining players during the limited duration, the gaming system provides to the other player the reset value of the progressive award (or the reset value of the progressive award incremented by a portion of the progressive award contributions made during the limited duration).

In certain embodiments, rather than deeming certain players ineligible to win a progressive award (or an incremented amount of a progressive award) during a limited duration following an occurrence of a progressive award exclusivity event, the gaming system selectively employs one or more supplemental award pools during the limited duration following the occurrence of the progressive award exclusivity event. In these embodiments, each of the players remain eligible to win the progressive award during the limited duration but only an individual player is eligible to also win part or all of the supplemental award pool during the limited duration. For example, upon a progressive award exclusivity event occurring in association with a maintained progressive award for a first player, for a limited period of time, the gaming system modifies, based on funds associated with a hidden progressive award, the value of the maintained progressive award for the first player without modifying the value of the maintained progressive award for any other player.

Figure 2E:
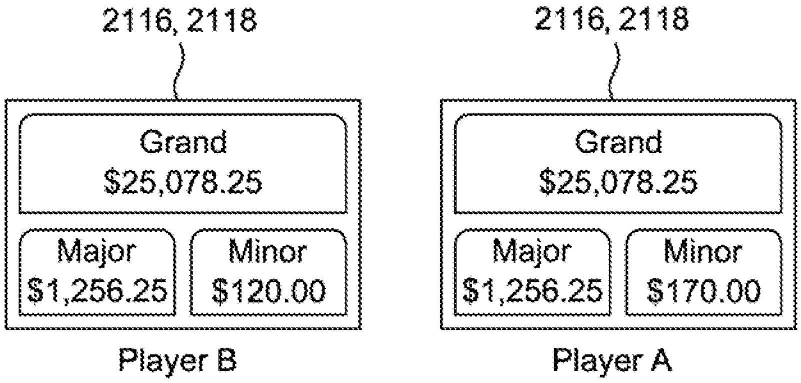

In certain embodiments, when associating a modified award with a specific player for a period of exclusivity, the gaming system displays one version of that award to that specific player and displays another version of that award to the remaining players. For example, as seen in FIG. 2E, following the gaming system associating the minor progressive award valued at $120.00 with Player A (not shown), the gaming system causes the display device of the EGM being played by Player A to display the minor progressive award valued at $170.00 (i.e., the minor progressive award of $120.00 modified by $50.00 from a reserve pool of funds) and causes the display device of an EGM being played by Player B (i.e., another player not associated with any exclusivity of winning the minor progressive award) to show the minor progressive award valued at $120.00. In certain embodiments, when associating one version of an award enhanced by funds from a reserve pool with a specific player for a period of exclusivity and associating another version of that award with one or more other players for the period of exclusivity, the gaming system displays both versions of the award to the other players and provides such remaining players additional information regarding their ineligibility to win the enhanced version of that award, such as by displaying the player and/or EGM whom the enhanced version of the award is currently exclusively associated with.

In certain embodiments, the amount (or percentage) of the reserve pool of funds added to the maintained award for the specific player during the period of exclusivity is a static amount or percentage. In certain embodiments, the amount (or percentage) of the reserve pool of funds added to the maintained award for the specific player during the period of exclusivity is a dynamic amount or percentage. In one such embodiment, the dynamic amount or percentage is randomly determined. In certain other embodiments, the amount (or percentage) of the reserve pool of funds added to the maintained award for the specific player during the period of exclusivity is based on an identity of the specific player, such as based on a player tracking status of the specific player and/or a historical amount of game play by that specific player. In these embodiments, different players having different statuses (and/or different tracked amounts of historical gameplay) are allocated different portions of the reserve pool of funds during the period of exclusivity. In certain other embodiments, the amount (or percentage) of the reserve pool of funds added to the maintained award for the specific player during the period of exclusivity is based on the amount of the maintained award and/or the amount of the reserve pool of funds. In these embodiments, different amounts of the maintained award (and/or different amounts of the reserve pool of funds) are allocated different portions of the reserve pool of funds during the period of exclusivity.

In these embodiments, upon a progressive award triggering event occurring in association with the first player currently associated with an enhanced award, that player wins the modified value of the award and upon a progressive award triggering event occurring in association with a second, different player not currently associated with an enhanced award, that second player wins the unmodified value of the award. As such, by enabling different players to play for different instances of an award during a period of exclusivity, if a progressive award triggering event occurs during that period of exclusivity, the gaming system determines if the player associated with the occurrence of the progressive award triggering event is the specific player associated with the maintained award for the temporary duration and if so, the gaming system causes the current value of that maintained award modified by part or all of the reserve pool of funds to be provided to the specific player. On the other hand, if the gaming system determines that the player associated with the occurrence of the progressive award triggering event is not the specific player associated with the maintained award for the temporary duration, the gaming system causes the current value of that maintained award (which is not modified by part or all of the reserve pool of funds) to be provided to that player.

In certain embodiments, the progressive award takes one or more forms such as, but not limited to, one or more of: an increasing quantity of monetary credits, an increasing quantity of non-monetary credits, an increasing quantity of promotional credits, an increasing quantity of player tracking points, an increasing modifier, such as an increasing multiplier, an increasing quantity of free plays of one or more games, an increasing quantity of plays of one or more secondary or bonus games, an increasing multiplier of a quantity of free plays of a game, one or more increasing lottery based awards, such as an increasing quantity of lottery or drawing tickets, an increasing wager match for one or more plays of one or more games, an incrementing increase in the average expected payback percentage for one or more plays of one or more games, an increasing comp (e.g., a free dinner, a free night's stay at a hotel), an increasing quantity of bonus credits usable for online play, an increasing multiplier for player tracking points or credits, an increasing quantity of virtual goods associated with the gaming system, and/or an increasing quantity of virtual goods not associated with the gaming system.

In certain embodiments, the progressive award additionally or alternatively includes an increasing quantity of activations of a feature of a game and/or an increasing magnitude of the activation of a feature of a game. In different embodiments, such features include any feature that results in a modification of one or more components, aspects, or elements of one or more subsequent plays of a game, such as the modification of one or more game outcomes of one or more plays of a game (e.g., the symbols evaluated for the play(s) of the game), the modification of the paytable utilized for one or more plays of the game and/or the modification of any award determined for one or more plays of the game. In different embodiments, such features include, but are not limited to: a feature which superimposed one or more symbols over the randomly generated symbols of the reels; a feature which replaces one or more symbols of the randomly generated symbols of the reels with a predetermined symbol pattern; a feature which replaces one or more symbols of the randomly generated symbols of the reels with a predetermined pattern of wild symbols; a modifier, such as a multiplier, feature; a book-end wild symbols feature; a stacked wild symbols feature; an expanding wild symbols feature; a nudging wild symbols feature; a feature modifying a quantity of wild symbols available to be generated; a retrigger symbol feature; an anti-terminator symbol feature; a locking reel feature; an expanding reel feature; a locking symbol position feature; a feature modifying a placed wager amount; a feature modifying a placed side wager amount; a feature modifying a number of wagered on paylines; a feature modifying a wager placed on one or more paylines (or on one or more designated paylines); a feature modifying a number of ways to win wagered on; a feature modifying a wager placed on one or more ways to win (or on one or more designated ways to win); a feature modifying a paytable utilized for a play of a game; a feature modifying an average expected payback percentage of a play of a game; a feature modifying an average expected payout of a play of a game; a feature modifying one or more awards available; a feature modifying a range of awards available; a feature modifying a type of awards available; a feature modifying one or more progressive awards; a feature modifying which progressive awards are available to be won; a feature modifying one or more modifiers, such as multipliers, available; a feature modifying an activation of a reel (or a designated reel); a feature modifying an activation of a plurality of reels; a feature modifying a generated outcome (or a designated generated outcome); a feature modifying a generated outcome (or a designated generated outcome) associated with an award over a designated value; a feature modifying a generated outcome (or a designated generated outcome) on a designated payline; a feature modifying a generated outcome (or a designated generated outcome) in a scatter configuration; a feature modifying a winning way to win (or a designated winning way to win); a feature modifying a designated symbol or symbol combination; a feature modifying a generation of a designated symbol or symbol combination on a designated payline; a feature modifying a generation of a designated symbol or symbol combination in a scatter configuration; a feature modifying a quantity of picks in a selection game; a feature modifying a quantity of offers in an offer and acceptance game; a feature modifying a quantity of moves in a trail game; a feature modifying an amount of free spins provided; a feature modifying a game terminating or ending condition; a feature modifying how one or more aspects of one or more games (e.g., colors, speeds, sound) are displayed to a player; and/or a feature modifying any game play feature associated with any play of any game of the present disclosure.

In different embodiments, as described above, a progressive award increment event, a progressive award exclusivity event, an exclusive award release event, a progressive award triggering event, and/or a progressive award reset event occurs based on an outcome associated with one or more plays of any primary games or any secondary games. In one embodiment, such determinations are symbol driven based on the generation of one or more designated symbols or symbol combinations. In various embodiments, a generation of a designated symbol (or sub-symbol) or a designated set of symbols (or sub-symbols) over one or more plays of a primary game (and/or a secondary game) causes such conditions to be satisfied and/or one or more of such events to occur.

In different embodiments, the gaming system does not provide any apparent reasons to the players for an occurrence of a progressive award increment event, a progressive award exclusivity event, an exclusive award release event, a progressive award triggering event, and/or a progressive award reset event. In these embodiments, such determinations are not triggered by an event in a primary game or based specifically on any of the plays of any primary games or any secondary games. That is, these events occur without any explanation or alternatively with simple explanations.

In one such embodiment, a progressive award increment event, a progressive award exclusivity event, an exclusive award release event, a progressive award triggering event, and/or a progressive award reset event occurs based on an amount of coin-in. In this embodiment, the gaming system determines if an amount of coin-in reaches or exceeds a designated amount of coin-in (i.e., a threshold coin-in amount). Upon the amount of coin-in wagered reaching or exceeding the threshold coin-in amount, the gaming system causes one or more of such events or conditions to occur. In another such embodiment, a progressive award increment event, a progressive award exclusivity event, an exclusive award release event, a progressive award triggering event, and/or a progressive award reset event occurs based on an amount of virtual currency-in. In this embodiment, the gaming system determines if an amount of virtual currency-in wagered reaches or exceeds a designated amount of virtual currency-in (i.e., a threshold virtual currency-in amount). Upon the amount of virtual currency-in wagered reaching or exceeding the threshold virtual currency-in amount, the gaming system causes one or more of such events or conditions to occur. In different embodiments, the threshold coin-in amount and/or the threshold virtual currency-in amount is predetermined, randomly determined, determined based on a player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day) or determined based on any other suitable method or criteria.

In one such embodiment, a progressive award increment event, a progressive award exclusivity event, an exclusive award release event, a progressive award triggering event, and/or a progressive award reset event occurs based on an amount of coin-out. In this embodiment, the gaming system determines if an amount of coin-out reaches or exceeds a designated amount of coin-out (i.e., a threshold coin-out amount). Upon the amount of coin-out reaching or exceeding the threshold coin-out amount, the gaming system causes one or more of such events or conditions to occur. In another such embodiment, a progressive award increment event, a progressive award exclusivity event, an exclusive award release event, a progressive award triggering event, and/or a progressive award reset event occurs based on an amount of virtual currency-out. In this embodiment, the gaming system determines if an amount of virtual currency-out reaches or exceeds a designated amount of virtual currency-out (i.e., a threshold virtual currency-out amount). Upon the amount of virtual currency-out reaching or exceeding the threshold virtual currency-out amount, the gaming system causes one or more of such events or conditions to occur. In different embodiments, the threshold coin-out amount and/or the threshold virtual currency-out amount is predetermined, randomly determined, determined based on a player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day) or determined based on any other suitable method or criteria.

In different embodiments, a progressive award increment event, a progressive award exclusivity event, an exclusive award release event, a progressive award triggering event, and/or a progressive award reset event occurs based on a predefined variable reaching a defined parameter threshold. For example, when a quantity of players have played an EGM (ascertained from a player tracking system), one or more of such events or conditions occur. In different embodiments, the predefined parameter thresholds include a length of time, a length of time after a certain dollar amount is hit, a wager level threshold for a specific device (which gaming device is the first to contribute a predetermined amount), a number of gaming devices active, or any other parameter that defines a suitable threshold.

In different embodiments, a progressive award increment event, a progressive award exclusivity event, an exclusive award release event, a progressive award triggering event, and/or a progressive award reset event occurs based on a quantity of games played. In this embodiment, a quantity of games played is set for when one or more of such events or conditions will occur. In one embodiment, such a set quantity of games played is based on historic data.

In different embodiments, a progressive award increment event, a progressive award exclusivity event, an exclusive award release event, a progressive award triggering event, and/or a progressive award reset event occurs based on time. In this embodiment, a time is set for when one or more of such events or conditions will occur. In one embodiment, such a set time is based on historic data.

In different embodiments, a progressive award increment event, a progressive award exclusivity event, an exclusive award release event, a progressive award triggering event, and/or a progressive award reset event occurs based upon gaming system operator defined player eligibility parameters stored on a player tracking system (such as via a player tracking card or other suitable manner). In this embodiment, the parameters for eligibility are defined by the gaming system operator based on any suitable criterion. In one embodiment, the gaming system recognizes the player's identification (via the player tracking system) when the player inserts or otherwise associates their player tracking card in the EGM and/or logs into the player tracking system using a mobile device, such as a personal gaming device. The gaming system determines the player tracking level of the player and if the current player tracking level defined by the gaming system operator is eligible for one or more of such events or conditions. In one embodiment, the gaming system operator defines minimum bet levels required for such events or conditions to occur based on the player's card level.

In different embodiments, a progressive award increment event, a progressive award exclusivity event, an exclusive award release event, a progressive award triggering event, and/or a progressive award reset event occurs based on a system determination, including one or more random selections by the central controller. For example, as described above, the gaming system tracks all active EGMs and the wagers they placed, wherein based on the EGM's state as well as one or more wager pools associated with the EGM, the gaming system determines whether to one or more of such events or conditions will occur. In one such embodiment, the player who consistently places a higher wager is more likely to be associated with an occurrence of one or more of such events or conditions than a player who consistently places a minimum wager. It should be appreciated that the criteria for determining whether a player is in active status or inactive status for determining if one or more of such events occur may the same as, substantially the same as, or different than the criteria for determining whether a player is in active status or inactive status for another one of such events to occur.

In different embodiments, a progressive award increment event, a progressive award exclusivity event, an exclusive award release event, a progressive award triggering event, and/or a progressive award reset event occurs based on a determination of if any numbers allotted to a gaming device match a randomly selected number. In this embodiment, upon or prior to each play of each gaming device, a gaming device selects a random number from a range of numbers and during each primary game, the gaming device allocates the first N numbers in the range, where N is the number of credits bet by the player in that primary game. At the end of the primary game, the randomly selected number is compared with the numbers allocated to the player and if a match occurs, one or more of such events or conditions occur.

It should be appreciated that any suitable manner of causing a progressive award increment event, a progressive award exclusivity event, an exclusive award release event, a progressive award triggering event, and/or a progressive award reset event to occur may be implemented in accordance with the gaming system and method of the present disclosure. It should be further appreciated that one or more of the above-described triggers pertaining to a progressive award increment event, a progressive award exclusivity event, an exclusive award release event, a progressive award triggering event, and/or a progressive award reset event occurring may be combined in one or more different embodiments.

It should be appreciated that in different embodiments, one or more of:

i. when a progressive award increment event, a progressive award exclusivity event, an exclusive award release event, a progressive award triggering event, and/or a progressive award reset event occurs;

ii. a frequency which a progressive award increment event, a progressive award exclusivity event, an exclusive award release event, a progressive award triggering event, and/or a progressive award reset event occur;

iii. which player to associate with an occurrence of a progressive award exclusivity event;

iv. a period of exclusivity associated with an occurrence of a progressive award exclusivity event;

V. a quantity of maintained progressive awards;

vi. a reset value associated with a progressive award;

vii. a progressive award contribution rate associated with one or more progressive awards;

viii. whether to retain a period of exclusivity following a progressive award triggering event; and/or ix. any determination of the present disclosure;

is/are predetermined, randomly determined, randomly determined based on one or more weighted percentages, determined based on a symbol or symbol combination, determined independent of any symbols or symbol combinations, determined based on a random determination by a server, determined independent of a random determination by a server, determined based on at least one play of at least one game, determined independent of at least one play of at least one game, determined based on a player's selection, determined independent of a player's selection, determined based on one or more side wagers placed, determined independent of one or more side wagers placed, determined based on the player's primary game wager, determined independent of the player's primary game wager, determined based on time (such as the time of day), determined independent of time (such as the time of day), determined based on an amount of coin-in accumulated in one or more pools, determined independent of an amount of coin-in accumulated in one or more pools, determined based on a status of the player (i.e., a player tracking status), determined independent of a status of the player (i.e., a player tracking status), determined based on one or more other determinations of the present disclosure, determined independent of any other determination of the present disclosure or determined based on any other suitable method or criteria.

The above-described embodiments of the present disclosure may be implemented in accordance with or in conjunction with one or more of a variety of different types of gaming systems, such as, but not limited to, those described below.

The present disclosure contemplates a variety of different gaming systems each having one or more of a plurality of different features, attributes, or characteristics. A "gaming system" as used herein refers to various configurations of: (a) one or more servers; (b) one or more electronic gaming machines such as those located on a casino floor; and/or (c) one or more personal gaming devices. Thus, in various embodiments, the gaming system of the present disclosure includes: (a) one or more electronic gaming machines in combination with one or more servers; (b) one or more personal gaming devices in combination with one or more servers; (c) one or more personal gaming devices in combination with one or more electronic gaming machines; (d) one or more personal gaming devices, one or more electronic gaming machines, and one or more servers in combination with one another; (e) a single electronic gaming machine; (f) a plurality of electronic gaming machines in combination with one another; (g) a single personal gaming device; (h) a plurality of personal gaming devices in combination with one another; (i) a single server; and/or (j) a plurality of servers in combination with one another. For brevity and clarity and unless specifically stated otherwise, "EGM" as used herein represents one EGM or a plurality of EGMs, "personal gaming device" as used herein represents one personal gaming device or a plurality of personal gaming devices, and "server" as used herein represents one server or a plurality of servers.

As noted above, in various embodiments, the gaming system includes an EGM (or personal gaming device) in combination with a server. In such embodiments, the EGM (or personal gaming device) is configured to communicate with the server through a data network or remote communication link. In certain such embodiments, the EGM (or personal gaming device) is configured to communicate with another EGM (or personal gaming device) through the same data network or remote communication link or through a different data network or remote communication link. For example, the gaming system includes a plurality of EGMs that are each configured to communicate with a server through a data network.

In certain embodiments in which the gaming system includes an EGM (or personal gaming device) in combination with a server, the server is any suitable computing device (such as a server) that includes at least one processor and at least one memory device or data storage device. As further described herein, the EGM (or personal gaming device) includes at least one EGM (or personal gaming device) processor configured to transmit and receive data or signals representing events, messages, commands, or any other suitable information between the EGM (or personal gaming device) and the server. The at least one processor of that EGM (or personal gaming device) is configured to execute the events, messages, or commands represented by such data or signals in conjunction with the operation of the EGM (or personal gaming device). Moreover, the at least one processor of the server is configured to transmit and receive data or signals representing events, messages, commands, or any other suitable information between the server and the EGM (or personal gaming device). The at least one processor of the server is configured to execute the events, messages, or commands represented by such data or signals in conjunction with the operation of the server. One, more than one, or each of the functions of the server may be performed by the at least one processor of the EGM (or personal gaming device). Further, one, more than one, or each of the functions of the at least one processor of the EGM (or personal gaming device) may be performed by the at least one processor of the server.

In certain such embodiments, computerized instructions for controlling any games (such as any primary or base games and/or any secondary or bonus games) displayed by the EGM (or personal gaming device) are executed by the server. In such "thin client" embodiments, the server remotely controls any games (or other suitable interfaces) displayed by the EGM (or personal gaming device), and the EGM (or personal gaming device) is utilized to display such games (or suitable interfaces) and to receive one or more inputs or commands. In other such embodiments, computerized instructions for controlling any games displayed by the EGM (or personal gaming device) are communicated from the server to the EGM (or personal gaming device) and are stored in at least one memory device of the EGM (or personal gaming device). In such "thick client" embodiments, the at least one processor of the EGM (or personal gaming device) executes the computerized instructions to control any games (or other suitable interfaces) displayed by the EGM (or personal gaming device).

In various embodiments in which the gaming system includes a plurality of EGMs (or personal gaming devices), one or more of the EGMs (or personal gaming devices) are thin client EGMs (or personal gaming devices) and one or more of the EGMs (or personal gaming devices) are thick client EGMs (or personal gaming devices). In other embodiments in which the gaming system includes one or more EGMs (or personal gaming devices), certain functions of one or more of the EGMs (or personal gaming devices) are implemented in a thin client environment, and certain other functions of one or more of the EGMs (or personal gaming devices) are implemented in a thick client environment. In one such embodiment in which the gaming system includes an EGM (or personal gaming device) and a server, computerized instructions for controlling any primary or base games displayed by the EGM (or personal gaming device) are communicated from the server to the EGM (or personal gaming device) in a thick client configuration, and computerized instructions for controlling any secondary or bonus games or other functions displayed by the EGM (or personal gaming device) are executed by the server in a thin client configuration.

In certain embodiments in which the gaming system includes: (a) an EGM (or personal gaming device) configured to communicate with a server through a data network; and/or (b) a plurality of EGMs (or personal gaming devices) configured to communicate with one another through a data network, the data network is a local area network (LAN) in which the EGMs (or personal gaming devices) are located substantially proximate to one another and/or the server. In one example, the EGMs (or personal gaming devices) and the server are located in a gaming establishment or a portion of a gaming establishment.

In other embodiments in which the gaming system includes: (a) an EGM (or personal gaming device) configured to communicate with a server through a data network; and/or (b) a plurality of EGMs (or personal gaming devices) configured to communicate with one another through a data network, the data network is a wide area network (WAN) in which one or more of the EGMs (or personal gaming devices) are not necessarily located substantially proximate to another one of the EGMs (or personal gaming devices) and/or the server. For example, one or more of the EGMs (or personal gaming devices) are located: (a) in an area of a gaming establishment different from an area of the gaming establishment in which the server is located; or (b) in a gaming establishment different from the gaming establishment in which the server is located. In another example, the server is not located within a gaming establishment in which the EGMs (or personal gaming devices) are located. In certain embodiments in which the data network is a WAN, the gaming system includes a server and an EGM (or personal gaming device) each located in a different gaming establishment in a same geographic area, such as a same city or a same state. Gaming systems in which the data network is a WAN are substantially identical to gaming systems in which the data network is a LAN, though the quantity of EGMs (or personal gaming devices) in such gaming systems may vary relative to one another.

In further embodiments in which the gaming system includes: (a) an EGM (or personal gaming device) configured to communicate with a server through a data network; and/or (b) a plurality of EGMs (or personal gaming devices) configured to communicate with one another through a data network, the data network is an internet (such as the Internet) or an intranet. In certain such embodiments, an Internet browser of the EGM (or personal gaming device) is usable to access an Internet game page from any location where an Internet connection is available. In one such embodiment, after the EGM (or personal gaming device) accesses the Internet game page, the server identifies a player before enabling that player to place any wagers on any plays of any wagering games. In one example, the server identifies the player by requiring a player account of the player to be logged into via an input of a unique username and password combination assigned to the player. The server may, however, identify the player in any other suitable manner, such as by validating a player tracking identification number associated with the player; by reading a player tracking card or other smart card inserted into a card reader (as described below); by validating a unique player identification number associated with the player by the server; or by identifying the EGM (or personal gaming device), such as by identifying the MAC address or the IP address of the Internet facilitator. In various embodiments, once the server identifies the player, the server enables placement of one or more wagers on one or more plays of one or more primary or base games and/or one or more secondary or bonus games, and displays those plays via the Internet browser of the EGM (or personal gaming device).

The server and the EGM (or personal gaming device) are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for players to use a variety of EGMs (or personal gaming devices) to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with players.

Figure 4:
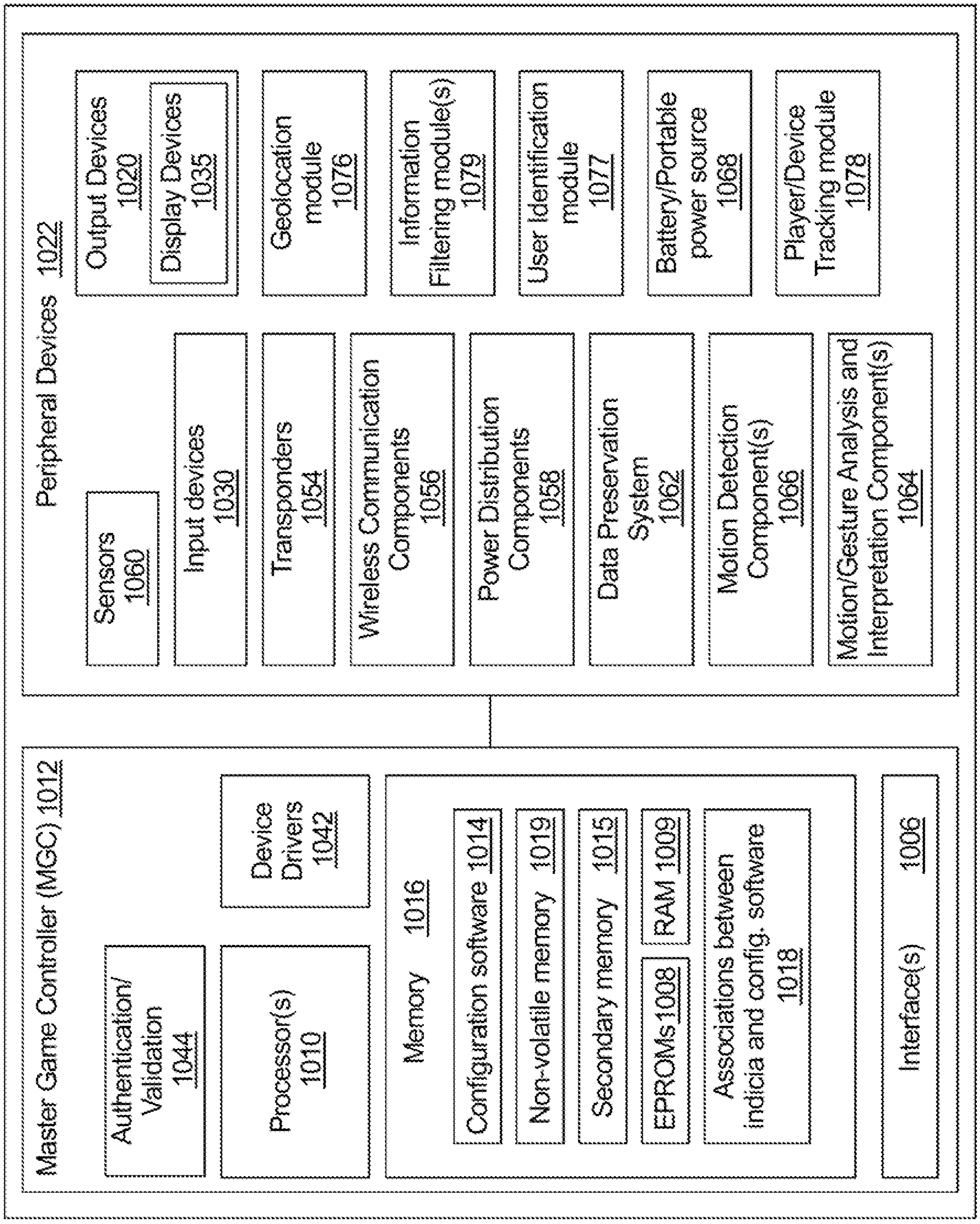
FIG. 4 is a schematic block diagram of one embodiment of an electronic configuration of an example electronic gaming machine of the present disclosure.
Figure 5A:
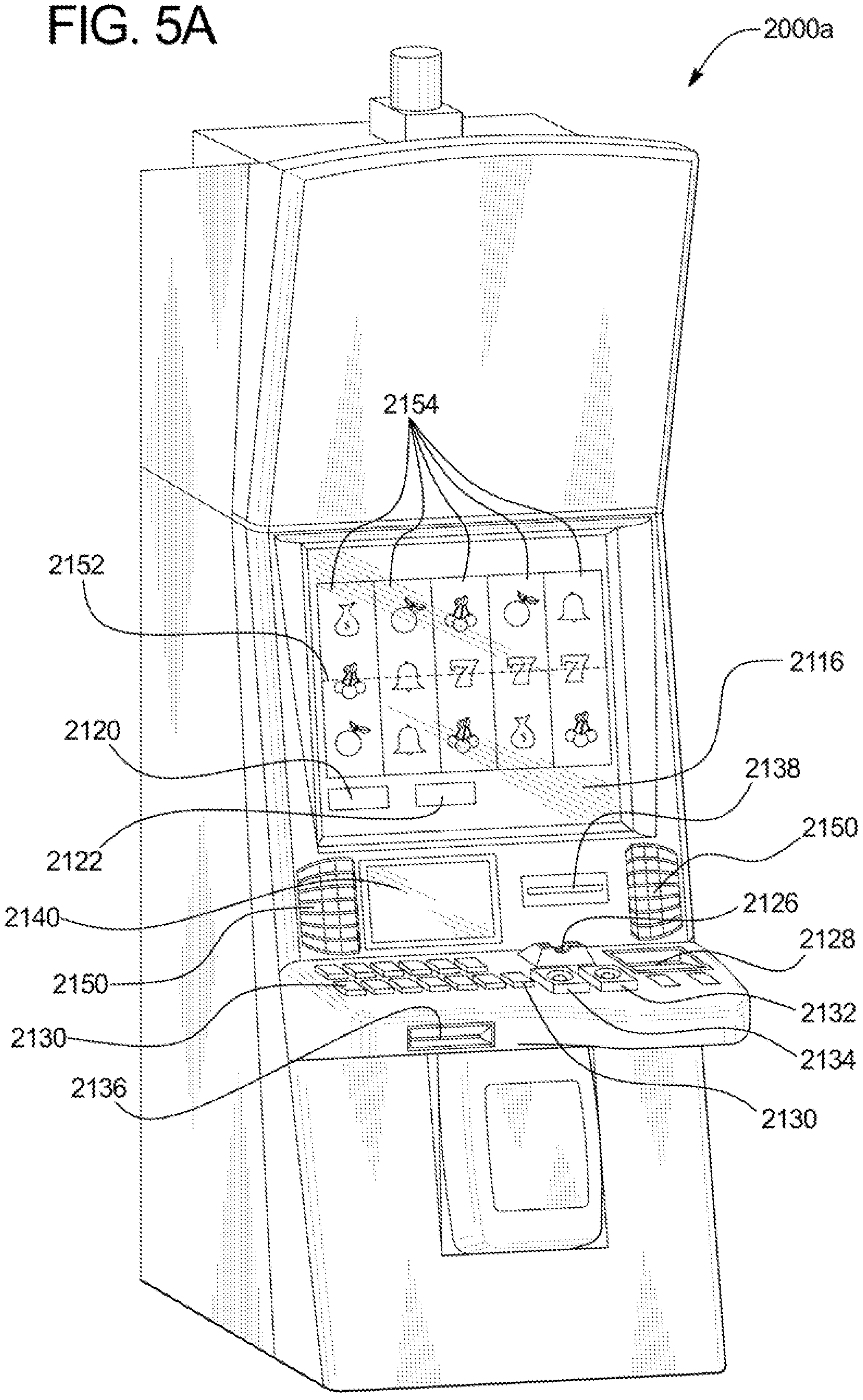
FIGS. 5A and 5B are perspective views of example alternative embodiments of an electronic gaming machine of the present disclosure.
Figure 5B:
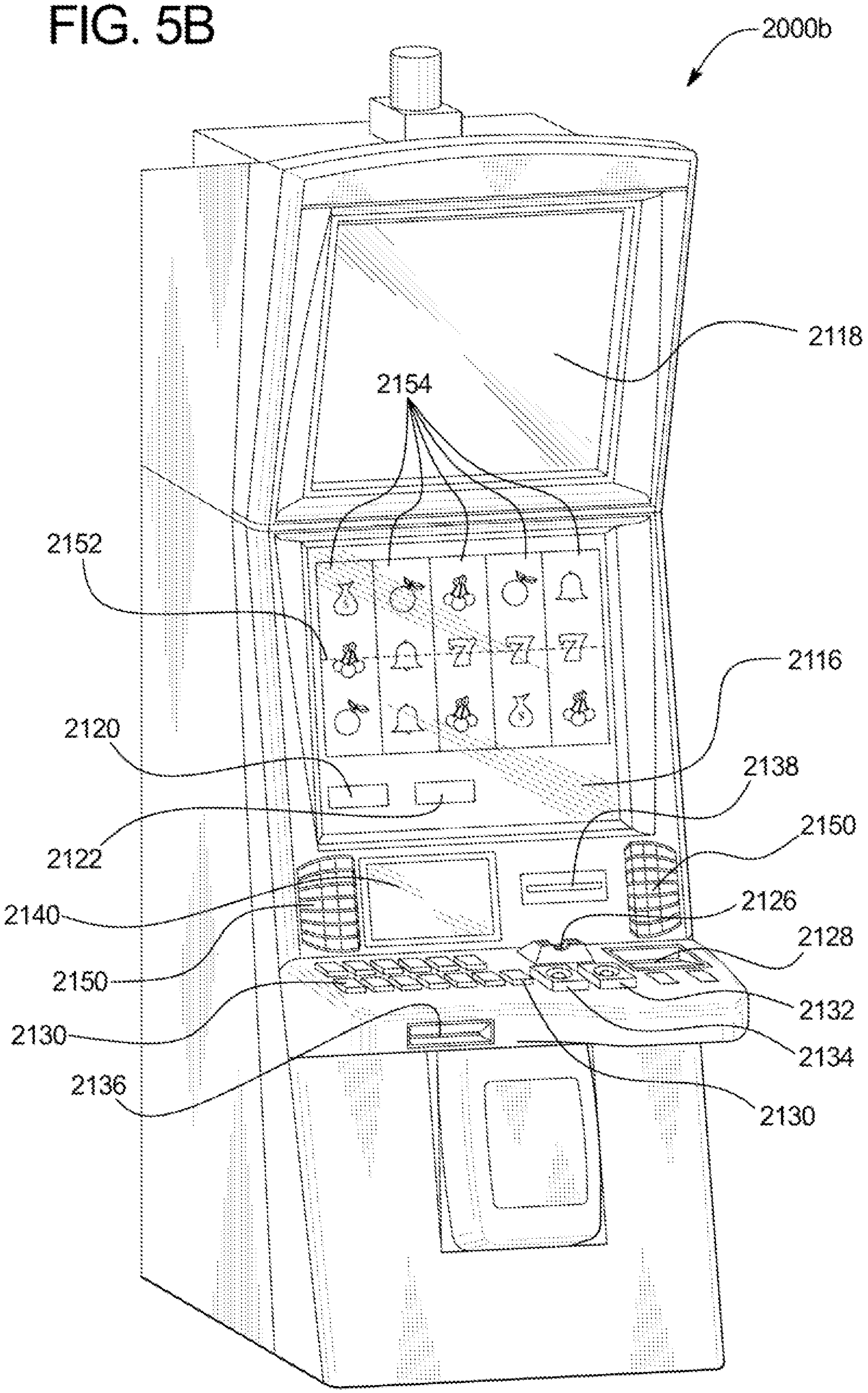
Figure 5C:
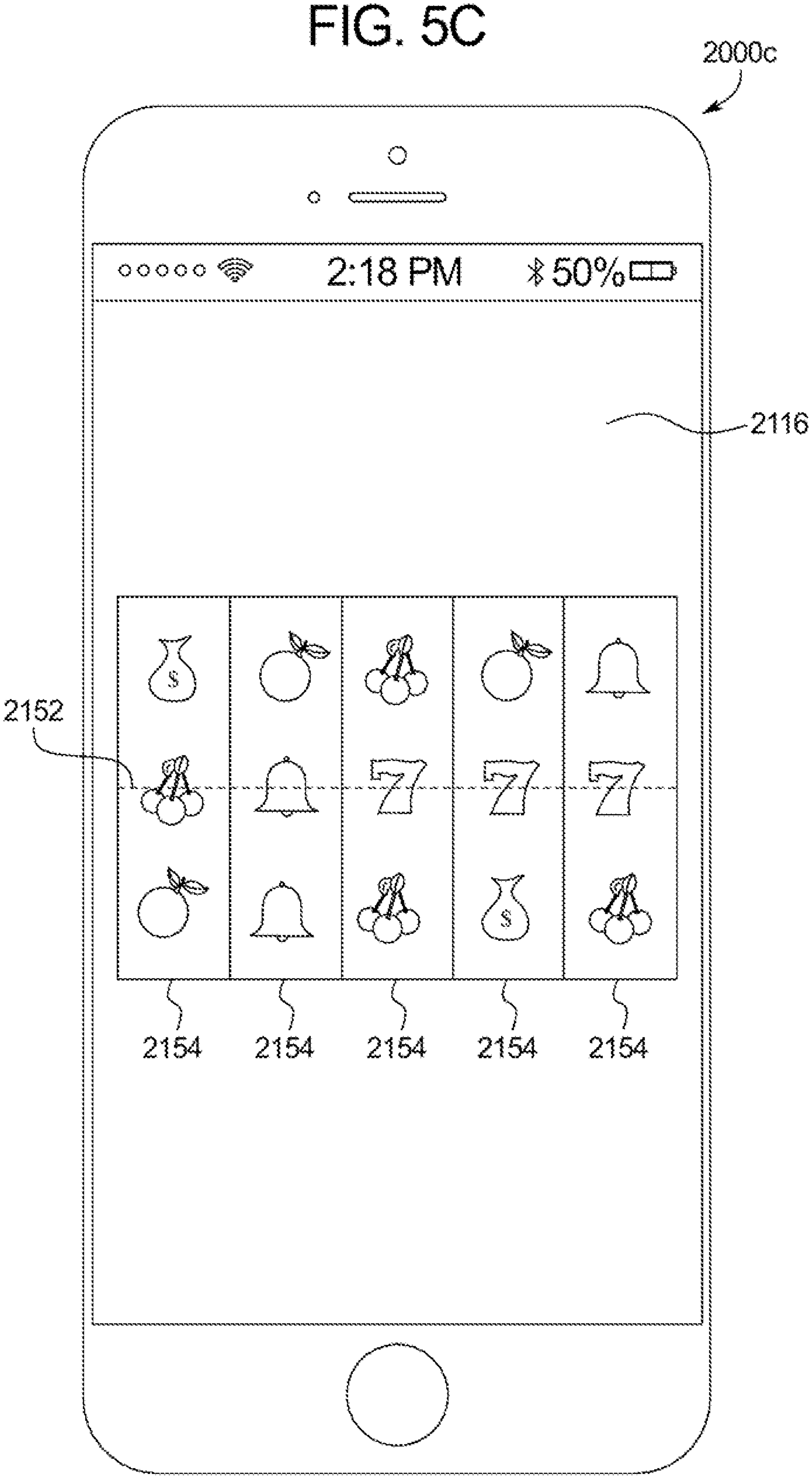
FIG. 5C is a front view of an example personal gaming device of the present disclosure.

FIG. 4 is a block diagram of an example EGM 1000 and FIGS. 5A and 5B include two different example EGMs 2000*a* and 2000*b*. The EGMs 1000, 2000*a*, and 2000*b* are merely example EGMs, and different EGMs may be implemented using different combinations of the components shown in the EGMs 1000, 2000*a*, and 2000*b*. Although the below refers to EGMs, in various embodiments personal gaming devices (such as personal gaming device 2000*c* of FIG. 5C) may include some or all of the below components.

In these embodiments, the EGM 1000 includes a master gaming controller 1012 configured to communicate with and to operate with a plurality of peripheral devices 1022.

The master gaming controller 1012 includes at least one processor 1010. The at least one processor 1010 is any suitable processing device or set of processing devices, such as a microprocessor, a microcontroller-based platform, a suitable integrated circuit, or one or more application-specific integrated circuits (ASICs), configured to execute software enabling various configuration and reconfiguration tasks, such as: (1) communicating with a remote source (such as a server that stores authentication information or game information) via a communication interface 1006 of the master gaming controller 1012; (2) converting signals read by an interface to a format corresponding to that used by software or memory of the EGM; (3) accessing memory to configure or reconfigure game parameters in the memory according to indicia read from the EGM; (4) communicating with interfaces and the peripheral devices 1022 (such as input/output devices); and/or (5) controlling the peripheral devices 1022. In certain embodiments, one or more components of the master gaming controller 1012 (such as the at least one processor 1010) reside within a housing of the EGM (described below), while in other embodiments at least one component of the master gaming controller 1012 resides outside of the housing of the EGM.

The master gaming controller 1012 also includes at least one memory device 1016, which includes: (1) volatile memory (e.g., RAM 1009, which can include non-volatile RAM, magnetic RAM, ferroelectric RAM, and any other suitable forms); (2) non-volatile memory 1019 (e.g., disk memory, FLASH memory, EPROMs, EEPROMs, memristor-based non-volatile solid-state memory, etc.); (3) unalterable memory (e.g., EPROMs 1008); (4) read-only memory; and/or (5) a secondary memory storage device 1015, such as a non-volatile memory device, configured to store gaming software related information (the gaming software related information and the memory may be used to store various audio files and games not currently being used and invoked in a configuration or reconfiguration). Any other suitable magnetic, optical, and/or semiconductor memory may operate in conjunction with the EGM of the present disclosure. In certain embodiments, the at least one memory device 1016 resides within the housing of the EGM (described below), while in other embodiments at least one component of the at least one memory device 1016 resides outside of the housing of the EGM. In these embodiments, any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

The at least one memory device 1016 is configured to store, for example: (1) configuration software 1014, such as all the parameters and settings for a game playable on the EGM; (2) associations 1018 between configuration indicia read from an EGM with one or more parameters and settings; (3) communication protocols configured to enable the at least one processor 1010 to communicate with the peripheral devices 1022; and/or (4) communication transport protocols (such as TCP/IP, USB, Firewire, IEEE1394, Bluetooth, IEEE 802.11x (IEEE 802.11 standards), hiperlan/2, HomeRF, etc.) configured to enable the EGM to communicate with local and non-local devices using such protocols. In one implementation, the master gaming controller 1012 communicates with other devices using a serial communication protocol. A few non-limiting examples of serial communication protocols that other devices, such as peripherals (e.g., a bill validator or a ticket printer), may use to communicate with the master game controller 1012 include USB, RS-232, and Netplex (a proprietary protocol developed by IGT).

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

In certain embodiments, the at least one memory device 1016 is configured to store program code and instructions executable by the at least one processor of the EGM to control the EGM. The at least one memory device 1016 of the EGM also stores other operating data, such as image data, event data, input data, random number generators (RNGs) or pseudo-RNGs, paytable data or information, and/or applicable game rules that relate to the play of one or more games on the EGM. In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an Internet or intranet).

The at least one memory device 1016 also stores a plurality of device drivers 1042. Examples of different types of device drivers include device drivers for EGM components and device drivers for the peripheral components 1022. Typically, the device drivers 1042 utilize various communication protocols that enable communication with a particular physical device. The device driver abstracts the hardware implementation of that device. For example, a device driver may be written for each type of card reader that could potentially be connected to the EGM. Non-limiting examples of communication protocols used to implement the device drivers include Netplex, USB, Serial, Ethernet 175, Firewire, I/O debouncer, direct memory map, serial, PCI, parallel, RF, Bluetooth™, near-field communications (e.g., using near-field magnetics), 802.11 (WiFi), etc. In one embodiment, when one type of a particular device is exchanged for another type of the particular device, the at least one processor of the EGM loads the new device driver from the at least one memory device to enable communication with the new device. For instance, one type of card reader in the EGM can be replaced with a second different type of card reader when device drivers for both card readers are stored in the at least one memory device.

In certain embodiments, the software units stored in the at least one memory device 1016 can be upgraded as needed. For instance, when the at least one memory device 1016 is a hard drive, new games, new game options, new parameters, new settings for existing parameters, new settings for new parameters, new device drivers, and new communication protocols can be uploaded to the at least one memory device 1016 from the master game controller 1012 or from some other external device. As another example, when the at least one memory device 1016 includes a CD/DVD drive including a CD/DVD configured to store game options, parameters, and settings, the software stored in the at least one memory device 1016 can be upgraded by replacing a first CD/DVD with a second CD/DVD. In yet another example, when the at least one memory device 1016 uses flash memory 1019 or EPROM 1008 units configured to store games, game options, parameters, and settings, the software stored in the flash and/or EPROM memory units can be upgraded by replacing one or more memory units with new memory units that include the upgraded software. In another embodiment, one or more of the memory devices, such as the hard drive, may be employed in a game software download process from a remote software server.

In some embodiments, the at least one memory device 1016 also stores authentication and/or validation components 1044 configured to authenticate/validate specified EGM components and/or information, such as hardware components, software components, firmware components, peripheral device components, user input device components, information received from one or more user input devices, information stored in the at least one memory device 1016, etc.

In certain embodiments, the peripheral devices 1022 include several device interfaces, such as: (1) at least one output device 1020 including at least one display device 1035; (2) at least one input device 1030 (which may include contact and/or non-contact interfaces); (3) at least one transponder 1054; (4) at least one wireless communication component 1056; (5) at least one wired/wireless power distribution component 1058; (6) at least one sensor 1060; (7) at least one data preservation component 1062; (8) at least one motion/gesture analysis and interpretation component 1064; (9) at least one motion detection component 1066; (10) at least one portable power source 1068; (11) at least one geolocation module 1076; (12) at least one user identification module 1077; (13) at least one player/device tracking module 1078; and (14) at least one information filtering module 1079.

The at least one output device 1020 includes at least one display device 1035 configured to display any game(s) displayed by the EGM and any suitable information associated with such game(s). In certain embodiments, the display devices are connected to or mounted on a housing of the EGM (described below). In various embodiments, the display devices serve as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM 2000*a* illustrated in FIG. 5A includes a central display device 2116, a player tracking display 2140, a credit display 2120, and a bet display 2122. The example EGM 2000*b* illustrated in FIG. 5B includes a central display device 2116, an upper display device 2118, a player tracking display 2140, a credit display 2120, and a bet display 2122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. The display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, the at least one output device 1020 includes a payout device. In these embodiments, after the EGM receives an actuation of a cashout device (described below), the EGM causes the payout device to provide a payment to the player. In one embodiment, the payout device is one or more of: (a) a ticket printer and dispenser configured to print and dispense a ticket or credit slip associated with a monetary value, wherein the ticket or credit slip may be redeemed for its monetary value via a cashier, a kiosk, or other suitable redemption system; (b) a bill dispenser configured to dispense paper currency; (c) a coin dispenser configured to dispense coins or tokens (such as into a coin payout tray); and (d) any suitable combination thereof. The example EGMs 2000*a* and 2000*b* illustrated in FIGS. 5A and 5B each include a ticket printer and dispenser 2136.

In certain embodiments, rather than dispensing bills, coins, or a physical ticket having a monetary value to the player following receipt of an actuation of the cashout device, the payout device is configured to cause a payment to be provided to the player in the form of an electronic funds transfer, such as via a direct deposit into a bank account, a casino account, or a prepaid account of the player; via a transfer of funds onto an electronically recordable identification card or smart card of the player; or via sending a virtual ticket having a monetary value to an electronic device of the player.

While any credit balances, any wagers, any values, and any awards are described herein as amounts of monetary credits or currency, one or more of such credit balances, such wagers, such values, and such awards may be for non-monetary credits, promotional credits, of player tracking points or credits.

In certain embodiments, the at least one output device 1020 is a sound generating device controlled by one or more sound cards. In one such embodiment, the sound generating device includes one or more speakers or other sound generating hardware and/or software configured to generate sounds, such as by playing music for any games or by playing music for other modes of the EGM, such as an attract mode. The example EGMs 2000*a* and 2000*b* illustrated in FIGS. 5A and 5B each include a plurality of speakers 2150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

The at least one input device 1030 may include any suitable device that enables an input signal to be produced and received by the at least one processor 1010 of the EGM.

In one embodiment, the at least one input device 1030 includes a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. The example EGMs 2000*a* and 2000*b* illustrated in FIGS. 5A and 5B each include a combined bill and ticket acceptor 2128 and a coin slot 2126.

In one embodiment, the at least one input device 1030 includes a payment device configured to enable the EGM to be funded via an electronic funds transfer, such as a transfer of funds from a bank account. In another embodiment, the EGM includes a payment device configured to communicate with a mobile device of a player, such as a mobile phone, a radio frequency identification tag, or any other suitable wired or wireless device, to retrieve relevant information associated with that player to fund the EGM. When the EGM is funded, the at least one processor determines the amount of funds entered and displays the corresponding amount on a credit display or any other suitable display as described below.

In certain embodiments, the at least one input device 1030 includes at least one wagering or betting device. In various embodiments, the one or more wagering or betting devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). One such wagering or betting device is as a maximum wager or bet device that, when actuated, causes the EGM to place a maximum wager on a play of a game. Another such wagering or betting device is a repeat bet device that, when actuated, causes the EGM to place a wager that is equal to the previously-placed wager on a play of a game. A further such wagering or betting device is a bet one device that, when actuated, causes the EGM to increase the wager by one credit. Generally, upon actuation of one of the wagering or betting devices, the quantity of credits displayed in a credit meter (described below) decreases by the amount of credits wagered, while the quantity of credits displayed in a bet display (described below) increases by the amount of credits wagered.

In various embodiments, the at least one input device 1030 includes at least one game play activation device. In various embodiments, the one or more game play initiation devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). After a player appropriately funds the EGM and places a wager, the EGM activates the game play activation device to enable the player to actuate the game play activation device to initiate a play of a game on the EGM (or another suitable sequence of events associated with the EGM). After the EGM receives an actuation of the game play activation device, the EGM initiates the play of the game. The example EGMs 2000*a* and 2000*b* illustrated in FIGS. 5A and 5B each include a game play activation device in the form of a game play initiation button 2132. In other embodiments, the EGM begins game play automatically upon appropriate funding rather than upon utilization of the game play activation device.

In other embodiments, the at least one input device 1030 includes a cashout device. In various embodiments, the cashout device is: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). When the EGM receives an actuation of the cashout device from a player and the player has a positive (i.e., greater-than-zero) credit balance, the EGM initiates a payout associated with the player's credit balance. The example EGMs 2000*a* and 2000*b* illustrated in FIGS. 5A and 5B each include a cashout device in the form of a cashout button 2134.

In various embodiments, the at least one input device 1030 includes a plurality of buttons that are programmable by the EGM operator to, when actuated, cause the EGM to perform particular functions. For instance, such buttons may be hard keys, programmable soft keys, or icons icon displayed on a display device of the EGM (described below) that are actuatable via a touch screen of the EGM (described below) or via use of a suitable input device of the EGM (such as a mouse or a joystick). The example EGMs 2000*a* and 2000*b* illustrated in FIGS. 5A and 5B each include a plurality of such buttons 2130.

In certain embodiments, the at least one input device 1030 includes a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In embodiments including a player tracking system, as further described below, the at least one input device 1030 includes a card reader in communication with the at least one processor of the EGM. The example EGMs 2000*a* and 2000*b* illustrated in FIGS. 5A and 5B each include a card reader 2138. The card reader is configured to read a player identification card inserted into the card reader.

The at least one wireless communication component 1056 includes one or more communication interfaces having different architectures and utilizing a variety of protocols, such as (but not limited to) 802.11 (WiFi); 802.15 (including Bluetooth™); 802.16 (WiMax); 802.22; cellular standards such as CDMA, CDMA2000, and WCDMA; Radio Frequency (e.g., RFID); infrared; and Near Field Magnetic communication protocols. The at least one wireless communication component 1056 transmits electrical, electromagnetic, or optical signals that carry digital data streams or analog signals representing various types of information.

The at least one wired/wireless power distribution component 1058 includes components or devices that are configured to provide power to other devices. For example, in one embodiment, the at least one power distribution component 1058 includes a magnetic induction system that is configured to provide wireless power to one or more user input devices near the EGM. In one embodiment, a user input device docking region is provided, and includes a power distribution component that is configured to recharge a user input device without requiring metal-to-metal contact. In one embodiment, the at least one power distribution component 1058 is configured to distribute power to one or more internal components of the EGM, such as one or more rechargeable power sources (e.g., rechargeable batteries) located at the EGM.

In certain embodiments, the at least one sensor 1060 includes at least one of: optical sensors, pressure sensors, RF sensors, infrared sensors, image sensors, thermal sensors, and biometric sensors. The at least one sensor 1060 may be used for a variety of functions, such as:

detecting movements and/or gestures of various objects within a predetermined proximity to the EGM; detecting the presence and/or identity of various persons (e.g., players, casino employees, etc.), devices (e.g., user input devices), and/or systems within a predetermined proximity to the EGM.

The at least one data preservation component 1062 is configured to detect or sense one or more events and/or conditions that, for example, may result in damage to the EGM and/or that may result in loss of information associated with the EGM. Additionally, the data preservation system 1062 may be operable to initiate one or more appropriate action(s) in response to the detection of such events/conditions.

The at least one motion/gesture analysis and interpretation component 1064 is configured to analyze and/or interpret information relating to detected player movements and/or gestures to determine appropriate player input information relating to the detected player movements and/or gestures. For example, in one embodiment, the at least one motion/gesture analysis and interpretation component 1064 is configured to perform one or more of the following functions: analyze the detected gross motion or gestures of a player; interpret the player's motion or gestures (e.g., in the context of a casino game being played) to identify instructions or input from the player; utilize the interpreted instructions/input to advance the game state; etc. In other embodiments, at least a portion of these additional functions may be implemented at a remote system or device.

The at least one portable power source 1068 enables the EGM to operate in a mobile environment. For example, in one embodiment, the EGM 300 includes one or more rechargeable batteries.

The at least one geolocation module 1076 is configured to acquire geolocation information from one or more remote sources and use the acquired geolocation information to determine information relating to a relative and/or absolute position of the EGM. For example, in one implementation, the at least one geolocation module 1076 is configured to receive GPS signal information for use in determining the position or location of the EGM. In another implementation, the at least one geolocation module 1076 is configured to receive multiple wireless signals from multiple remote devices (e.g., EGMs, servers, wireless access points, etc.) and use the signal information to compute position/location information relating to the position or location of the EGM.

The at least one user identification module 1077 is configured to determine the identity of the current user or current owner of the EGM. For example, in one embodiment, the current user is required to perform a login process at the EGM in order to access one or more features. Alternatively, the EGM is configured to automatically determine the identity of the current user based on one or more external signals, such as an RFID tag or badge worn by the current user and that provides a wireless signal to the EGM that is used to determine the identity of the current user. In at least one embodiment, various security features are incorporated into the EGM to prevent unauthorized users from accessing confidential or sensitive information.

The at least one information filtering module 1079 is configured to perform filtering (e.g., based on specified criteria) of selected information to be displayed at one or more displays 1035 of the EGM.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices.

As generally described above, in certain embodiments, such as the example EGMs 2000*a* and 2000*b* illustrated in FIGS. 5A and 5B, the EGM has a support structure, housing, or cabinet that provides support for a plurality of the input devices and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs 2000*a* and 2000*b* shown in FIGS. 5A and 5B, EGMs may have varying housing and display configurations.

In certain embodiments, the EGM is a device that has obtained approval from a regulatory gaming commission, and in other embodiments, the EGM is a device that has not obtained approval from a regulatory gaming commission.

The EGMs described above are merely three examples of different types of EGMs. Certain of these example EGMs may include one or more elements that may not be included in all gaming systems, and these example EGMs may not include one or more elements that are included in other gaming systems. For example, certain EGMs include a coin acceptor while others do not.

In various embodiments, an EGM may be implemented in one of a variety of different configurations. In various embodiments, the EGM may be implemented as one of: (a) a dedicated EGM in which computerized game programs executable by the EGM for controlling any primary or base games (referred to herein as "primary games") and/or any secondary or bonus games or other functions (referred to herein as "secondary games") displayed by the EGM are provided with the EGM before delivery to a gaming establishment or before being provided to a player; and (b) a changeable EGM in which computerized game programs executable by the EGM for controlling any primary games and/or secondary games displayed by the EGM are downloadable or otherwise transferred to the EGM through a data network or remote communication link; from a USB drive, flash memory card, or other suitable memory device; or in any other suitable manner after the EGM is physically located in a gaming establishment or after the EGM is provided to a player.

As generally explained above, in various embodiments in which the gaming system includes a server and a changeable EGM, the at least one memory device of the server stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the server is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the server to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award.

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards.

In certain embodiments in which the gaming system includes a server and an EGM, the EGM is configured to communicate with the server for monitoring purposes only. In such embodiments, the EGM determines the game outcome(s) and/or award(s) to be provided in any of the manners described above, and the server monitors the activities and events occurring on the EGM. In one such embodiment, the gaming system includes a real-time or online accounting and gaming information system configured to communicate with the server. In this embodiment, the accounting and gaming information system includes: (a) a player database configured to store player profiles, (b) a player tracking module configured to track players (as described below), and (c) a credit system configured to provide automated transactions.

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. The example EGM **2000*b* shown in FIG. 5B includes a payline 1152 and a plurality of reels 1154**. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display areas on a requisite number of adjacent reels. In one such embodiment, one or more paylines are formed between at least two symbol display areas that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display areas, the gaming system enables a wager to be placed on a plurality of symbol display areas, which activates those symbol display areas.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display areas on the requisite number of adjacent reels (i.e., not on paylines passing through any displayed winning symbol combinations). If a winning symbol combination is generated on the reels, one award for that occurrence of the generated winning symbol combination is provided.

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award.

As generally noted above, in addition to providing winning credits or other awards for one or more plays of the primary game(s), in various embodiments the gaming system provides credits or other awards for one or more plays of one or more secondary games. The secondary game typically enables an award to be obtained addition to any award obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game(s). The secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a “BONUS” symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. Any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for providing the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards.

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a mobile phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device.

In various embodiments, the gaming system includes one or more servers configured to communicate with a personal gaming device—such as a smartphone, a tablet computer, a desktop computer, or a laptop computer—to enable web-based game play using the personal gaming device. In various embodiments, the player must first access a gaming website via an Internet browser of the personal gaming device or execute an application (commonly called an "app") installed on the personal gaming device before the player can use the personal gaming device to participate in web-based game play. In certain embodiments, the one or more servers and the personal gaming device operate in a thin-client environment. In these embodiments, the personal gaming device receives inputs via one or more input devices (such as a touch screen and/or physical buttons), the personal gaming device sends the received inputs to the one or more servers, the one or more servers make various determinations based on the inputs and determine content to be displayed (such as a randomly determined game outcome and corresponding award), the one or more servers send the content to the personal gaming device, and the personal gaming device displays the content.

In certain such embodiments, the one or more servers must identify the player before enabling game play on the personal gaming device (or, in some embodiments, before enabling monetary wager-based game play on the personal gaming device). In these embodiments, the player must identify herself to the one or more servers, such as by inputting the player's unique username and password combination, providing an input to a biometric sensor (e.g., a fingerprint sensor, a retinal sensor, a voice sensor, or a facial-recognition sensor), or providing any other suitable information.

Once identified, the one or more servers enable the player to establish an account balance from which the player can draw credits usable to wager on plays of a game. In certain embodiments, the one or more servers enable the player to initiate an electronic funds transfer to transfer funds from a bank account to the player's account balance. In other embodiments, the one or more servers enable the player to make a payment using the player's credit card, debit card, or other suitable device to add money to the player's account balance. In other embodiments, the one or more servers enable the player to add money to the player's account balance via a peer-to-peer type application, such as PayPal or Venmo. The one or more servers also enable the player to cash out the player's account balance (or part of it) in any suitable manner, such as via an electronic funds transfer, by initiating creation of a paper check that is mailed to the player, or by initiating printing of a voucher at a kiosk in a gaming establishment.

In certain embodiments, the one or more servers include a payment server that handles establishing and cashing out players' account balances and a separate game server configured to determine the outcome and any associated award for a play of a game. In these embodiments, the game server is configured to communicate with the personal gaming device and the payment device, and the personal gaming device and the payment device are not configured to directly communicate with one another. In these embodiments, when the game server receives data representing a request to start a play of a game at a desired wager, the game server sends data representing the desired wager to the payment server. The payment server determines whether the player's account balance can cover the desired wager (i.e., includes a monetary balance at least equal to the desired wager).

If the payment server determines that the player's account balance cannot cover the desired wager, the payment server notifies the game server, which then instructs the personal gaming device to display a suitable notification to the player that the player's account balance is too low to place the desired wager. If the payment server determines that the player's account balance can cover the desired wager, the payment server deducts the desired wager from the account balance and notifies the game server. The game server then determines an outcome and any associated award for the play of the game. The game server notifies the payment server of any nonzero award, and the payment server increases the player's account balance by the nonzero award. The game server sends data representing the outcome and any award to the personal gaming device, which displays the outcome and any award.

In certain embodiments, the one or more servers enable web-based game play using a personal gaming device only if the personal gaming device satisfies one or more jurisdictional requirements. In one embodiment, the one or more servers enable web-based game play using the personal gaming device only if the personal gaming device is located within a designated geographic area (such as within certain state or county lines or within the boundaries of a gaming establishment). In this embodiment, the geolocation module of the personal gaming device determines the location of the personal gaming device and sends the location to the one or more servers, which determine whether the personal gaming device is located within the designated geographic area. In various embodiments, the one or more servers enable non-monetary wager-based game play if the personal gaming device is located outside of the designated geographic area.

In various embodiments, the gaming system includes an EGM configured to communicate with a personal gaming device—such as a smartphone, a tablet computer, a desktop computer, or a laptop computer—to enable tethered mobile game play using the personal gaming device. Generally, in these embodiments, the EGM establishes communication with the personal gaming device and enables the player to play games on the EGM remotely via the personal gaming device. In certain embodiments, the gaming system includes a geo-fence system that enables tethered game play within a particular geographic area but not outside of that geographic area.

In certain embodiments, the gaming system is configured to communicate with a social network server that hosts or partially hosts a social networking website via a data network (such as the Internet) to integrate a player's gaming experience with the player's social networking account. This enables the gaming system to send certain information to the social network server that the social network server can use to create content (such as text, an image, and/or a video) and post it to the player's wall, newsfeed, or similar area of the social networking website accessible by the player's connections (and in certain cases the public) such that the player's connections can view that information. This also enables the gaming system to receive certain information from the social network server, such as the player's likes or dislikes or the player's list of connections. In certain embodiments, the gaming system enables the player to link the player's player account to the player's social networking account(s). This enables the gaming system to, once it identifies the player and initiates a gaming session (such as via the player logging in to a website (or an application) on the player's personal gaming device or via the player inserting the player's player tracking card into an EGM), link that gaming session to the player's social networking account(s). In other embodiments, the gaming system enables the player to link the player's social networking account(s) to individual gaming sessions when desired by providing the required login information.

For instance, in one embodiment, if a player wins a particular award (e.g., a progressive award or a jackpot award) or an award that exceeds a certain threshold (e.g., an award exceeding $1,000), the gaming system sends information about the award to the social network server to enable the server to create associated content (such as a screenshot of the outcome and associated award) and to post that content to the player's wall (or other suitable area) of the social networking website for the player's connections to see (and to entice them to play). In another embodiment, if a player joins a multiplayer game and there is another seat available, the gaming system sends that information to the social network sever to enable the server to create associated content (such as text indicating a vacancy for that particular game) and to post that content to the player's wall (or other suitable area) of the social networking website for the player's connections to see (and to entice them to fill the vacancy). In another embodiment, if the player consents, the gaming system sends advertisement information or offer information to the social network server to enable the social network server to create associated content (such as text or an image reflecting an advertisement and/or an offer) and to post that content to the player's wall (or other suitable area) of the social networking website for the player's connections to see. In another embodiment, the gaming system enables the player to recommend a game to the player's connections by posting a recommendation to the player's wall (or other suitable area) of the social networking website.

Certain of the gaming systems described herein, such as EGMs located in a casino or another gaming establishment, include certain components and/or are configured to operate in certain manners that differentiate these systems from general purpose computing devices, i.e., certain personal gaming devices such as desktop computers and laptop computers.

For instance, EGMs are highly regulated to ensure fairness and, in many cases, EGMs are configured to award monetary awards up to multiple millions of dollars. To satisfy security and regulatory requirements in a gaming environment, hardware and/or software architectures are implemented in EGMs that differ significantly from those of general purpose computing devices. For purposes of illustration, a description of EGMs relative to general purpose computing devices and some examples of these additional (or different) hardware and/or software architectures found in EGMs are described below.

At first glance, one might think that adapting general purpose computing device technologies to the gaming industry and EGMs would be a simple proposition because both general purpose computing devices and EGMs employ processors that control a variety of devices. However, due to at least: (1) the regulatory requirements placed on EGMs, (2) the harsh environment in which EGMs operate, (3) security requirements, and (4) fault tolerance requirements, adapting general purpose computing device technologies to EGMs can be quite difficult. Further, techniques and methods for solving a problem in the general purpose computing device industry, such as device compatibility and connectivity issues, might not be adequate in the gaming industry. For instance, a fault or a weakness tolerated in a general purpose computing device, such as security holes in software or frequent crashes, is not tolerated in an EGM because in an EGM these faults can lead to a direct loss of funds from the EGM, such as stolen cash or loss of revenue when the EGM is not operating properly or when the random outcome determination is manipulated.

Certain differences between general purpose computing devices and EGMs are described below. A first difference between EGMs and general purpose computing devices is that EGMs are state-based systems. A state-based system stores and maintains its current state in a non-volatile memory such that, in the event of a power failure or other malfunction, the state-based system can return to that state when the power is restored or the malfunction is remedied. For instance, for a state-based EGM, if the EGM displays an award for a game of chance but the power to the EGM fails before the EGM provides the award to the player, the EGM stores the pre-power failure state in a non-volatile memory, returns to that state upon restoration of power, and provides the award to the player. This requirement affects the software and hardware design on EGMs. General purpose computing devices are not state-based machines, and a majority of data is usually lost when a malfunction occurs on a general purpose computing device.

A second difference between EGMs and general purpose computing devices is that, for regulatory purposes, the software on the EGM utilized to operate the EGM has been designed to be static and monolithic to prevent cheating by the operator of the EGM. For instance, one solution that has been employed in the gaming industry to prevent cheating and to satisfy regulatory requirements has been to manufacture an EGM that can use a proprietary processor running instructions to provide the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used to operate a device during generation of the game of chance, can require burning a new EPROM approved by the gaming jurisdiction and reinstalling the new EPROM on the EGM in the presence of a gaming regulator. Regardless of whether the EPROM solution is used, to gain approval in most gaming jurisdictions, an EGM must demonstrate sufficient safeguards that prevent an operator or a player of an EGM from manipulating the EGM's hardware and software in a manner that gives him an unfair, and in some cases illegal, advantage.

A third difference between EGMs and general purpose computing devices is authentication-EGMs storing code are configured to authenticate the code to determine if the code is unaltered before executing the code. If the code has been altered, the EGM prevents the code from being executed. The code authentication requirements in the gaming industry affect both hardware and software designs on EGMs. Certain EGMs use hash functions to authenticate code. For instance, one EGM stores game program code, a hash function, and an authentication hash (which may be encrypted). Before executing the game program code, the EGM hashes the game program code using the hash function to obtain a result hash and compares the result hash to the authentication hash. If the result hash matches the authentication hash, the EGM determines that the game program code is valid and executes the game program code. If the result hash does not match the authentication hash, the EGM determines that the game program code has been altered (i.e., may have been tampered with) and prevents execution of the game program code.

A fourth difference between EGMs and general purpose computing devices is that EGMs have unique peripheral device requirements that differ from those of a general purpose computing device, such as peripheral device security requirements not usually addressed by general purpose computing devices. For instance, monetary devices, such as coin dispensers, bill validators, and ticket printers and computing devices that are used to govern the input and output of cash or other items having monetary value (such as tickets) to and from an EGM have security requirements that are not typically addressed in general purpose computing devices. Therefore, many general purpose computing device techniques and methods developed to facilitate device connectivity and device compatibility do not address the emphasis placed on security in the gaming industry.

To address some of the issues described above, a number of hardware/software components and architectures are utilized in EGMs that are not typically found in general purpose computing devices. These hardware/software components and architectures, as described below in more detail, include but are not limited to watchdog timers, voltage monitoring systems, state-based software architecture and supporting hardware, specialized communication interfaces, security monitoring, and trusted memory.

Certain EGMs use a watchdog timer to provide a software failure detection mechanism. In a normally-operating EGM, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits include a loadable timeout counter register to enable the operating software to set the timeout interval within a certain range of time. A differentiating feature of some circuits is that the operating software cannot completely disable the function of the watchdog timer. In other words, the watchdog timer always functions from the time power is applied to the board.

Certain EGMs use several power supply voltages to operate portions of the computer circuitry. These can be generated in a central power supply or locally on the computer board. If any of these voltages falls out of the tolerance limits of the circuitry they power, unpredictable operation of the EGM may result. Though most modern general purpose computing devices include voltage monitoring circuitry, these types of circuits only report voltage status to the operating software. Out of tolerance voltages can cause software malfunction, creating a potential uncontrolled condition in the general purpose computing device. Certain EGMs have power supplies with relatively tighter voltage margins than that required by the operating circuitry. In addition, the voltage monitoring circuitry implemented in certain EGMs typically has two thresholds of control. The first threshold generates a software event that can be detected by the operating software and an error condition then generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the EGM.

As described above, certain EGMs are state-based machines. Different functions of the game provided by the EGM (e.g., bet, play, result, points in the graphical presentation, etc.) may be defined as a state. When the EGM moves a game from one state to another, the EGM stores critical data regarding the game software in a custom non-volatile memory subsystem. This ensures that the player's wager and credits are preserved and to minimize potential disputes in the event of a malfunction on the EGM. In general, the EGM does not advance from a first state to a second state until critical information that enables the first state to be reconstructed has been stored. This feature enables the EGM to recover operation to the current state of play in the event of a malfunction, loss of power, etc. that occurred just before the malfunction. In at least one embodiment, the EGM is configured to store such critical information using atomic transactions.

Generally, an atomic operation in computer science refers to a set of operations that can be combined so that they appear to the rest of the system to be a single operation with only two possible outcomes: success or failure. As related to data storage, an atomic transaction may be characterized as series of database operations which either all occur, or all do not occur. A guarantee of atomicity prevents updates to the database occurring only partially, which can result in data corruption.

To ensure the success of atomic transactions relating to critical information to be stored in the EGM memory before a failure event (e.g., malfunction, loss of power, etc.), memory that includes one or more of the following criteria be used: direct memory access capability; data read/write capability which meets or exceeds minimum read/write access characteristics (such as at least 5.08 Mbytes/sec (Read) and/or at least 38.0 Mbytes/sec (Write)). Memory devices that meet or exceed the above criteria may be referred to as "fault-tolerant" memory devices.

Typically, battery-backed RAM devices may be configured to function as fault-tolerant devices according to the above criteria, whereas flash RAM and/or disk drive memory are typically not configurable to function as fault-tolerant devices according to the above criteria. Accordingly, battery-backed RAM devices are typically used to preserve EGM critical data, although other types of non-volatile memory devices may be employed. These memory devices are typically not used in typical general purpose computing devices.

Thus, in at least one embodiment, the EGM is configured to store critical information in fault-tolerant memory (e.g., battery-backed RAM devices) using atomic transactions. Further, in at least one embodiment, the fault-tolerant memory is able to successfully complete all desired atomic transactions (e.g., relating to the storage of EGM critical information) within a time period of 200 milliseconds or less. In at least one embodiment, the time period of 200 milliseconds represents a maximum amount of time for which sufficient power may be available to the various EGM components after a power outage event has occurred at the EGM.

As described previously, the EGM may not advance from a first state to a second state until critical information that enables the first state to be reconstructed has been atomically stored. After the state of the EGM is restored during the play of a game of chance, game play may resume and the game may be completed in a manner that is no different than if the malfunction had not occurred. Thus, for example, when a malfunction occurs during a game of chance, the EGM may be restored to a state in the game of chance just before when the malfunction occurred. The restored state may include metering information and graphical information that was displayed on the EGM in the state before the malfunction. For example, when the malfunction occurs during the play of a card game after the cards have been dealt, the EGM may be restored with the cards that were previously displayed as part of the card game. As another example, a bonus game may be triggered during the play of a game of chance in which a player is required to make a number of selections on a video display screen. When a malfunction has occurred after the player has made one or more selections, the EGM may be restored to a state that shows the graphical presentation just before the malfunction including an indication of selections that have already been made by the player. In general, the EGM may be restored to any state in a plurality of states that occur in the game of chance that occurs while the game of chance is played or to states that occur between the play of a game of chance.

Game history information regarding previous games played such as an amount wagered, the outcome of the game, and the like may also be stored in a non-volatile memory device. The information stored in the non-volatile memory may be detailed enough to reconstruct a portion of the graphical presentation that was previously presented on the EGM and the state of the EGM (e.g., credits) at the time the game of chance was played. The game history information may be utilized in the event of a dispute. For example, a player may decide that in a previous game of chance that they did not receive credit for an award that they believed they won. The game history information may be used to reconstruct the state of the EGM before, during, and/or after the disputed game to demonstrate whether the player was correct or not in the player's assertion.

Another feature of EGMs is that they often include unique interfaces, including serial interfaces, to connect to specific subsystems internal and external to the EGM. The serial devices may have electrical interface requirements that differ from the "standard" EIA serial interfaces provided by general purpose computing devices. These interfaces may include, for example, Fiber Optic Serial, optically coupled serial interfaces, current loop style serial interfaces, etc. In addition, to conserve serial interfaces internally in the EGM, serial devices may be connected in a shared, daisy-chain fashion in which multiple peripheral devices are connected to a single serial channel.

The serial interfaces may be used to transmit information using communication protocols that are unique to the gaming industry. For example, IGT's Netplex is a proprietary communication protocol used for serial communication between EGMs. As another example, SAS is a communication protocol used to transmit information, such as metering information, from an EGM to a remote device. Often SAS is used in conjunction with a player tracking system.

Certain EGMs may alternatively be treated as peripheral devices to a casino communication controller and connected in a shared daisy chain fashion to a single serial interface. In both cases, the peripheral devices are assigned device addresses. If so, the serial controller circuitry must implement a method to generate or detect unique device addresses. General purpose computing device serial ports are not able to do this.

Security monitoring circuits detect intrusion into an EGM by monitoring security switches attached to access doors in the EGM cabinet. Access violations result in suspension of game play and can trigger additional security operations to preserve the current state of game play. These circuits also function when power is off by use of a battery backup. In power-off operation, these circuits continue to monitor the access doors of the EGM. When power is restored, the EGM can determine whether any security violations occurred while power was off, e.g., via software for reading status registers. This can trigger event log entries and further data authentication operations by the EGM software.

Trusted memory devices and/or trusted memory sources are included in an EGM to ensure the authenticity of the software that may be stored on less secure memory subsystems, such as mass storage devices. Trusted memory devices and controlling circuitry are typically designed to not enable modification of the code and data stored in the memory device while the memory device is installed in the EGM. The code and data stored in these devices may include authentication algorithms, random number generators, authentication keys, operating system kernels, etc. The purpose of these trusted memory devices is to provide gaming regulatory authorities a root trusted authority within the computing environment of the EGM that can be tracked and verified as original. This may be accomplished via removal of the trusted memory device from the EGM computer and verification of the secure memory device contents is a separate third party verification device. Once the trusted memory device is verified as authentic, and based on the approval of the verification algorithms included in the trusted device, the EGM is enabled to verify the authenticity of additional code and data that may be located in the gaming computer assembly, such as code and data stored on hard disk drives.

In at least one embodiment, at least a portion of the trusted memory devices/sources may correspond to memory that cannot easily be altered (e.g., "unalterable memory") such as EPROMS, PROMS, Bios, Extended Bios, and/or other memory sources that are able to be configured, verified, and/or authenticated (e.g., for authenticity) in a secure and controlled manner.

According to one embodiment, when a trusted information source is in communication with a remote device via a network, the remote device may employ a verification scheme to verify the identity of the trusted information source. For example, the trusted information source and the remote device may exchange information using public and private encryption keys to verify each other's identities. In another embodiment, the remote device and the trusted information source may engage in methods using zero knowledge proofs to authenticate each of their respective identities.

EGMs storing trusted information may utilize apparatuses or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected.

Mass storage devices used in a general purpose computing devices typically enable code and data to be read from and written to the mass storage device. In a gaming environment, modification of the gaming code stored on a mass storage device is strictly controlled and would only be enabled under specific maintenance type events with electronic and physical enablers required. Though this level of security could be provided by software, EGMs that include mass storage devices include hardware level mass storage data protection circuitry that operates at the circuit level to monitor attempts to modify data on the mass storage device and will generate both software and hardware error triggers should a data modification be attempted without the proper electronic and physical enablers being present.

It should be appreciated that the terminology used herein is for the purpose of describing particular aspects only and is not intended to be limiting of the disclosure. For example, the singular forms "a", "an" and "the" are intended to include the plural forms as well, unless the context clearly indicates otherwise. In another example, the terms "including" and "comprising" and variations thereof, when used in this specification, specify the presence of stated features, steps, operations, elements, and/or components, but do not preclude the presence or addition of one or more other features, steps, operations, elements, components, and/or groups thereof. Additionally, a listing of items does not imply that any or all of the items are mutually exclusive nor does a listing of items imply that any or all of the items are collectively exhaustive of anything or in a particular order, unless expressly specified otherwise. Moreover, as used herein, the term "and/or" includes any and all combinations of one or more of the associated listed items. It should be further appreciated that headings of sections provided in this document and the title are for convenience only, and are not to be taken as limiting the disclosure in any way. Furthermore, unless expressly specified otherwise, devices that are in communication with each other need not be in continuous communication with each other and may communicate directly or indirectly through one or more intermediaries.

Various changes and modifications to the present embodiments described herein will be apparent to those skilled in the art. For example, a description of an embodiment with several components in communication with each other does not imply that all such components are required, or that each of the disclosed components must communicate with every other component. On the contrary a variety of optional components are described to illustrate the wide variety of possible embodiments of the present disclosure. As such, these changes and modifications can be made without departing from the spirit and scope of the present subject matter and without diminishing its intended technical scope. It is therefore intended that such changes and modifications be covered by the appended claims.

The invention is claimed as follows:

1. A gaming system comprising:

a processor; and a memory device that stores a plurality of instructions that, when executed by the processor, cause the processor to:

maintain a progressive award, responsive to an occurrence of a progressive award exclusivity event associated with a first player and a period of exclusivity, exclusively associate the progressive award with the first player, responsive to an occurrence of a progressive award triggering event in association with the first player during the period of exclusivity, cause the progressive award to be provided to the first player, and responsive to an occurrence of the progressive award triggering event in association with a second, different player during the period of exclusivity, continue to maintain the progressive award without causing the progressive award to be provided to the second, different player.

2. The gaming system of claim 1, wherein the period of exclusivity concludes responsive to the occurrence of the progressive award triggering event in association with the first player.

3. The gaming system of claim 1, wherein the period of exclusivity concludes following at least one of an amount of time, a quantity of games played by the first player, a quantity of games played by any player, an amount won by the first player, an amount won by any player and a termination of a gaming session by the first player.

4. The gaming system of claim 1, wherein the progressive award exclusivity event randomly occurs in association with the first player.

5. The gaming system of claim 1, wherein the memory device stores a plurality of further instructions that, when executed by the processor, cause the processor to enable the first player to purchase the occurrence of the progressive award exclusivity event.

6. The gaming system of claim 1, wherein the first player comprises a group of players.

7. The gaming system of claim 6, wherein the memory device stores a plurality of further instructions that, when executed by the processor responsive to an occurrence of the progressive award triggering event in association with any player of the group of players during the period of exclusivity, cause the processor to cause the progressive award to be provided to that player of the group of players.

8. The gaming system of claim 1, wherein the memory device stores a plurality of further instructions that, when executed by the processor during the period of exclusivity, cause the processor to communicate data that results in a display device displaying to the second player information associated with at least one of the first player and the period of exclusivity.

9. The gaming system of claim 1, wherein the memory device stores a plurality of further instructions that, when executed by the processor during the period of exclusivity, cause the processor to communicate data that results in a display device ceasing to display the progressive award to the second player.

10. The gaming system of claim 1, wherein the memory device stores a plurality of further instructions that, when executed by the processor responsive to an occurrence of a progressive award increment event associated with the second, different player during the period of exclusivity, cause the processor to increase a value of the progressive award.

11. A gaming system comprising:

a processor; and a memory device that stores a plurality of instructions that, when executed by the processor, cause the processor to:

maintain a progressive award, responsive to an occurrence of a progressive award increment event, increment a value of the progressive award, responsive to an occurrence of a progressive award exclusivity event associated with a first player and a period of exclusivity, exclusively associate the incremented value of the progressive award with the first player, responsive to an occurrence of a progressive award triggering event in association with the first player during the period of exclusivity, cause the incremented value of the progressive award to be provided to the first player, and responsive to an occurrence of the progressive award triggering event in association with a second, different player during the period of exclusivity, cause a non-incremented value of the progressive award to be provided to the second, different player.

12. The gaming system of claim 11, wherein the memory device stores a plurality of further instructions that, when executed by the processor responsive to an occurrence of the progressive award increment event associated with the second, different player during the period of exclusivity, cause the processor to further increment the incremented value of the progressive award exclusively associated with the first player.

13. The gaming system of claim 11, wherein the memory device stores a plurality of further instructions that, when executed by the processor responsive to an occurrence of the progressive award increment event associated with the second, different player during the period of exclusivity, cause the processor to increment the non-incremented value of the progressive award.

14. The gaming system of claim 11, wherein the period of exclusivity associated with the occurrence of the progressive award exclusivity event concludes in association with at least one of the occurrence of the progressive award triggering event in association with the first player, an amount of time, a quantity of games played by the first player, a quantity of games played by any player, an amount won by the first player, an amount won by any player and a termination of a gaming session by the first player.

15. The gaming system of claim 11, wherein the progressive award exclusivity event randomly occurs in association with the first player.

16. The gaming system of claim 11, wherein the memory device stores a plurality of further instructions that, when executed by the processor, cause the processor to enable the first player to purchase the occurrence of the progressive award exclusivity event.

17. A gaming system comprising:

a processor; and a memory device that stores a plurality of instructions that, when executed by the processor, cause the processor to:

maintain a progressive award, responsive to an occurrence of a progressive award exclusivity event associated with a first player of a first player tracking status, exclusively associate the progressive award with the first player for a first period of exclusivity, wherein during the first period of exclusivity, the progressive award is locked against being provided to any player except the first player, and responsive to an occurrence of the progressive award exclusivity event associated with a second, different player of a second, different player tracking status, exclusively associate the progressive award with the second, different player for a second, different period of exclusivity, wherein during the second, different period of exclusivity, the progressive award is locked against being provided to any player except the second, different player.

18. The gaming system of claim 17, wherein the memory device stores a plurality of further instructions that, when executed by the processor, cause the processor to enable the first player to purchase the occurrence of the progressive award exclusivity event for a first purchase price and enable the second, different player to purchase the occurrence of the progressive award exclusivity event for a second, different purchase price.

19. The gaming system of claim 17, wherein the first player comprises a first group of players and the second, different player comprises a second, different group of players.

20. The gaming system of claim 17, wherein the memory device stores a plurality of further instructions that, when executed by the processor responsive to an occurrence of a progressive award increment event associated with the second, different player during the first period of exclusivity, cause the processor to increase a value of the progressive award locked against being provided to any player except the first player.

* * * * *